(12) United States Patent
Su

(10) Patent No.: US 7,853,534 B2
(45) Date of Patent: Dec. 14, 2010

(54) AUTHENTICATION-AUTHORIZATION SYSTEM FOR MOBILE COMMUNICATION TERMINAL AND METHOD THEREFOR

(76) Inventor: Min-Chieh Su, No. 111-4, Chiali 3rd Street, Chiali Tsun, Hsincheng Hsiang, Hualien Hsien (TW)

( * ) Notice: Subject to any disclaimer, the term of this patent is extended or adjusted under 35 U.S.C. 154(b) by 1225 days.

(21) Appl. No.: 11/448,389

(22) Filed: Jun. 7, 2006

(65) Prior Publication Data

US 2006/0242404 A1 Oct. 26, 2006

Related U.S. Application Data

(63) Continuation-in-part of application No. 10/704,627, filed on Nov. 12, 2003, now abandoned.

(30) Foreign Application Priority Data

Nov. 9, 2005 (TW) .............................. 94139323 A

(51) Int. Cl.
*G06Q 20/00* (2006.01)
(52) U.S. Cl. .............................. 705/67; 705/64; 705/65; 705/75; 705/76; 705/78; 705/79; 713/155; 713/156; 713/157; 713/158; 713/159; 726/1; 726/5; 726/17; 726/21
(58) Field of Classification Search .................. 705/64, 705/65, 67, 75, 76, 78, 79; 713/155, 156, 713/157, 158, 159; 726/1, 5, 17, 21
See application file for complete search history.

(56) References Cited

U.S. PATENT DOCUMENTS

2005/0136949 A1* 6/2005 Barnes ....................... 455/461

FOREIGN PATENT DOCUMENTS

EP 1213691 A2 * 6/2002

OTHER PUBLICATIONS

Teppo Halonen "Authentication and Authorization in Mobile Environment" Helsinki University of Technology Department of Computer Science. Retrieved from Google Oct. 25, 2010.*

* cited by examiner

*Primary Examiner*—James A Reagan
(74) *Attorney, Agent, or Firm*—Tim Tingkang Xia; Morris, Manning & Martin, LLP

(57) ABSTRACT

An authentication-authorization system for a mobile communication terminal and a method therefore are provided. When a mobile communication terminal is in a connect state, code data randomly generated by a remote encoding terminal is continuously provided to the terminal and data management terminal. When an application service program on the mobile communication terminal or an application service terminal connected to the mobile communication terminal need to execute an authentication-authorization, identification data of the mobile communication terminal and its card and code data can be offered to the data management terminal to carry out a bidirectional dynamic authentication-authorization, to determine whether allow the application service program or the application service terminal to keep providing an application service or not. In a further aspect of the embodiment, at least two aforementioned authentication-authorization systems are joined, and a layered authentication-authorization mechanism is adopted, so as to provide a secured and completed system.

65 Claims, 19 Drawing Sheets

| amount | mobile communication terminal | first code data | data management terminal | second code data |
|---|---|---|---|---|
| 01 | 42513263 | 2004.12.18. 13:00:00 | 42513263 | 2004.12.18. 13:00:00 |
| 02 | 2351 | 2004.12.18. 13:00:01 | 2351 | 2004.12.18. 13:00:01 |
| 03 | 368794 | 2004.12.18. 13:00:02 | 368794 | 2004.12.18. 13:00:02 |
| 04 | 3#@$% | 2004.12.18. 13:00:03 | 3#@$% | 2004.12.18. 13:00:03 |
| 05 | 138$% | 2004.12.18. 13:00:04 | 138$% | 2004.12.18. 13:00:04 |
| 06 | 32742 | 2004.12.18. 13:00:05 | 32742 | 2004.12.18. 13:00:05 |
| 07 | 5690^ | 2004.12.18. 13:00:06 | 5690^ | 2004.12.18. 13:00:06 |
| 08 | 1256237 | 2004.12.18. 13:00:07 | 1256237 | 2004.12.18. 13:00:07 |
| 09 | 1503& | 2004.12.18. 13:00:08 | 1503& | 2004.12.18. 13:00:08 |
| 10 | &%##@ | 2004.12.18. 13:00:09 | &%##@ | 2004.12.18. 13:00:09 |

| amount | mobile communication terminal | first code data | data management terminal | second code data |
|---|---|---|---|---|
| 01 | 246138 | 2004.12.18. 14:00:00 | 246138 | 2004.12.18. 14:00:00 |
| 02 | @#$56 | 2004.12.18. 14:00:00 | @#$56 | 2004.12.18. 14:00:00 |
| 03 | !213%* | 2004.12.18. 14:00:00 | !213%* | 2004.12.18. 14:00:00 |
| 04 | 42%^& | 2004.12.18. 14:00:03 | 42%^& | 2004.12.18. 14:00:03 |
| 05 | !%$@( | 2004.12.18. 14:00:03 | !%$@( | 2004.12.18. 14:00:03 |
| 06 | 13213 | 2004.12.18. 14:00:03 | 13213 | 2004.12.18. 14:00:03 |
| 07 | 42369723 | 2004.12.18. 14:00:03 | 42369723 | 2004.12.18. 14:00:03 |
| 08 | 250%%% | 2004.12.18. 14:00:09 | 250%%% | 2004.12.18. 14:00:09 |
| 09 | !!@@% | 2004.12.18. 14:00:09 | !!@@% | 2004.12.18. 14:00:09 |
| 10 | 13070818 | 2004.12.18. 14:00:09 | 13070818 | 2004.12.18. 14:00:09 |

| amount | mobile communication terminal | first code data | data management terminal | second code data |
|---|---|---|---|---|
| 01 | 246138 | 2004.12.18. 15:00:05 | 246138 | 2004.12.18. 15:00:05 |
| 02 | @#$56 | 2004.12.18. 15:00:05 | @#$56 | 2004.12.18. 15:00:05 |
| 03 | !213%* | 2004.12.18. 15:00:05 | !213%* | 2004.12.18. 15:00:05 |
| 04 | 42%^& | 2004.12.18. 15:00:05 | 42%^& | 2004.12.18. 15:00:05 |
| 05 | !%$@( | 2004.12.18. 15:00:05 | !%$@( | 2004.12.18. 15:00:05 |
| 06 | 13213 | 2004.12.18. 15:00:05 | 13213 | 2004.12.18. 15:00:05 |
| 07 | 42369723 | 2004.12.18. 15:00:05 | 42369723 | 2004.12.18. 15:00:05 |
| 08 | 250%%% | 2004.12.18. 15:00:05 | 250%%% | 2004.12.18. 15:00:05 |
| 09 | !!@@% | 2004.12.18. 15:00:05 | !!@@% | 2004.12.18. 15:00:05 |
| 10 | 13070818 | 2004.12.18. 15:00:05 | 13070818 | 2004.12.18. 15:00:05 |

| amount | mobile communication terminal | first code data | data management terminal | second code data |
|---|---|---|---|---|
| 01 | 2351 | 2004.12.18. 13:00:01 | 2351 | 2004.12.18. 13:00:01 |
| 02 | 138$% | 2004.12.18. 13:00:04 | 138$% | 2004.12.18. 13:00:04 |
| 03 | 32742 | 2004.12.18. 13:00:05 | 32742 | 2004.12.18. 13:00:05 |
| 04 | 5690^ | 2004.12.18. 13:00:06 | 5690^ | 2004.12.18. 13:00:06 |
| 05 | 1503& | 2004.12.18. 13:00:08 | 1503& | 2004.12.18. 13:00:08 |
| 06 | &%##@ | 2004.12.18. 13:00:09 | &%##@ | 2004.12.18. 13:00:09 |
| 07 | 2#%^ | 2004.12.18. 13:00:10 | 2#%^ | 2004.12.18. 13:00:10 |
| 08 | 46&^% | 2004.12.18. 13:00:10 | 46&^% | 2004.12.18. 13:00:10 |
| 09 | !#%@$ | 2004.12.18. 13:00:10 | !#%@$ | 2004.12.18. 13:00:10 |
| 10 | %&0_ | 2004.12.18. 13:00:10 | %&0_ | 2004.12.18. 13:00:10 |

103

FIG. 2e mobile communication terminal

| amount | first field | first code data | second field | first code data |
|---|---|---|---|---|
| 01 | 42513263 | 2004.12.18. 13:00:00 | 513792 | 2004.12.18. 13:00:10 |
| 02 | 2351 | 2004.12.18. 13:00:01 | 298V% | 2004.12.18. 13:00:11 |
| 03 | 368794 | 2004.12.18. 13:00:02 | CU%^$ | 2004.12.18. 13:00:12 |
| 04 | 3#@$% | 2004.12.18. 13:00:03 | QQ@!# | 2004.12.18. 13:00:13 |
| 05 | 138$% | 2004.12.18. 13:00:04 | ))NJH | 2004.12.18. 13:00:14 |
| 06 | 32742 | 2004.12.18. 13:00:05 | TT$#@ | 2004.12.18. 13:00:15 |
| 07 | 5690^ | 2004.12.18. 13:00:06 | &%^*0 | 2004.12.18. 13:00:16 | data management terminal 103

| amount | first field | first code data | second field | second code data |
|---|---|---|---|---|
| 01 | 42513263 | 2004.12.18. 13:00:00 | 513792 | 2004.12.18. 13:00:10 |
| 02 | 2351 | 2004.12.18. 13:00:01 | 298V% | 2004.12.18. 13:00:11 |
| 03 | 368794 | 2004.12.18. 13:00:02 | CU%^$ | 2004.12.18. 13:00:12 |
| 04 | 3#@$% | 2004.12.18. 13:00:03 | QQ@!# | 2004.12.18. 13:00:13 |
| 05 | 138$% | 2004.12.18. 13:00:04 | ))NJH | 2004.12.18. 13:00:14 |
| 06 | 32742 | 2004.12.18. 13:00:05 | TT$#@ | 2004.12.18. 13:00:15 |
| 07 | 5690^ | 2004.12.18. 13:00:06 | &%^*0 | 2004.12.18. 13:00:16 |

FIG. 2f

| amount | chip card | code data time (card) |
|---|---|---|
| 01 | 4787241 | 2004/07/13 13:13 04 |
| 02 | _+66# | 2004/07/13 13:13 05 |
| 03 | 2*&P}{ | 2004/07/13 13:13 06 |
| 04 | %$#@ @ | 2004/07/13 13:13 07 |
| 05 | 16GH$68 | 2004/07/13 13:13 08 |
| 06 | )(*HKI | 2004/07/13 13:13 09 |
| 07 | )^#@!% | 2004/07/13 13:13 10 |
| 08 | ><?JI | 2004/07/13 13:13 11 |
| 09 | 1503& | 2004/07/13 13:13 12 |
| 10 | 2#%^ | 2004/07/13 13:13 13 |

701

| amount | chip card | code data time (card) |
|---|---|---|
| 01 | A225 | 2004/07/13 13:13 04 |
| 02 | 081568 | 2004/07/13 13:13 05 |
| 03 | L22357 | 2004/07/13 13:13 06 |
| 04 | 572010 | 2004/07/13 13:13 07 |
| 05 | F2256 | 2004/07/13 13:13 08 |
| 06 | 97294 | 2004/07/13 13:13 09 |
| 07 | M12194 | 2004/07/13 13:13 10 |
| 08 | 1940340 | 2004/07/13 13:13 11 |
| 09 | 3201128 | 2004/07/13 13:13 12 |
| 10 | R22320 | 2004/07/13 13:13 13 |

| amount | chip card | code data time (card) |
|---|---|---|
| 01 | 4787241 | 2004/07/13 13:13 04 |
| 02 | _-+66# | 2004/07/13 13:13 05 |
| 03 | 2*&P}{ | 2004/07/13 13:13 06 |
| 04 | %$#@@ | 2004/07/13 13:13 07 |
| 05 | 16GH$68 | 2004/07/13 13:13 08 |
| 06 | )(*HKI | 2004/07/13 13:13 09 |
| 07 | )^#@!% | 2004/07/13 13:13 10 |
| 08 | ×<?)I | 2004/07/13 13:13 11 |
| 09 | 1503& | 2004/07/13 13:13 12 |
| 10 | 2#%^ | 2004/07/13 13:13 13 |
| 11 | A225 | 2004/07/13 13:13 04 |
| 12 | 081568 | 2004/07/13 13:13 05 |
| 13 | L22357 | 2004/07/13 13:13 06 |
| 14 | 572010 | 2004/07/13 13:13 07 |
| 15 | F2256 | 2004/07/13 13:13 08 |
| 16 | 97294 | 2004/07/13 13:13 09 |
| 17 | M12194 | 2004/07/13 13:13 10 |
| 18 | 1940340 | 2004/07/13 13:13 11 |
| 19 | 3201128 | 2004/07/13 13:13 12 |
| 20 | R22320 | 2004/07/13 13:13 13 |

AUTHENTICATION-AUTHORIZATION SYSTEM FOR MOBILE COMMUNICATION TERMINAL AND METHOD THEREFOR

CROSS-REFERENCE TO RELATED APPLICATIONS

This non-provisional application claims priority under 35 U.S.C. §119(a) on Patent Application No(s). 094139323 filed in Taiwan, R.O.C. on Nov. 9, 2005, the entire contents of which are hereby incorporated by reference.

This application is a continuation-in-part patent application of U.S. application Ser. No. 10/704,627 filed on Nov. 12, 2003, the entire contents of which are hereby incorporated by reference for which priority is claimed under 35 U.S.C. §120.

BACKGROUND OF THE INVENTION

1. Field of Invention

The present invention relates to an authentication-authorization system and a method therefore, and more particularly, to a system and method for carrying out a bidirectional authentication-authorization or multiple authentication-authorizations between a mobile communication terminal and a data management terminal through randomly generating a code data.

2. Related Art

At present, Internet and mobile telecommunication are the two of the technical fields experiencing the fastest development, and application service based on the combination of the two technical fields will become a main trend of future development.

In fact, plenty of application services have already entered the Internet from the mobile telecommunication network. For example, users can browse a website if having a mobile communication terminal connected to an Internet website, or can receive Internet information, such as finance information, weather information, and consumption information, if having a mobile communication terminal through a message transfer system. Nowadays, with wider relevant application services between the mobile telecommunication and the Internet together with the increasing convenience of the mobile communication terminal, it can be predicted that the number of users using Internet application services depended on mobile communication terminals will grow in at a ten-fold speed.

In the past, with the development of Internet-related application service, the quality of the authentication-authorization mechanism was a critical factor for determining whether an application service could be accepted by users. As most authentication-authorization mechanisms adopt a single unidirectional authentication mode, the mechanisms may be cracked easily after a certain time by those who intend to do so, affecting the security of the application service. Many authentication-authorization mechanisms emphasized to be more secure and reliable were proposed later, but they still adopt the single unidirectional authentication-authorization mode. In other words, the mechanisms will eventually be cracked, no matter how long it takes, and the security and reliability of the authentication-authorization cannot be guaranteed either.

As mentioned above, the combination of the Internet and the mobile telecommunication is a trend. Therefore, in the development of relevant application service, it is also very important to provide a complete, intact, and reliable authentication-authorization mechanism. Of course, it is most important to provide a mechanism with the characteristic of a bidirectional dynamic authentication-authorization technology, as the illegal behavior of those who intend to crack the mechanism can be prevented only by carrying out authentication-authorization through randomly generating an authentication data.

SUMMARY OF THE INVENTION

In view of above problems, an object of the present invention is to provide an authentication-authorization system for a mobile communication terminal and a method therefore, which improves the security and reliability of the authentication-authorization by a bidirectional dynamic code data.

A basic operation concept of the entire authentication-authorization mechanism includes an encoding terminal connected to the mobile communication terminal and the data management terminal for providing a random code data continuously; and when an authentication-authorization between the mobile communication terminal and the data management terminal is requested, such as when the mobile communication terminal executes an application service program or the mobile communication terminal connects to an application service terminal to request service, a bidirectional dynamic authentication-authorization being carried out by using a dynamic code data comparison together with other identification data, such as card identification data, mobile terminal identification data, and service terminal identification data. Since the code data is untraceable, the chance of those who intend to crack the mechanism to achieve illegal purposes can be reduced to the utmost.

In addition to an authentication-authorization architecture required when the mobile communication terminal executes the application service program, the present invention further comprises operation technical contents when the mobile communication terminal is connected to for the first time, when the mobile communication terminal executes an authentication-authorization, when the mobile communication terminal is in a disconnect state, and when the mobile communication terminal resumes connection.

Furthermore, a technical content for operating an authentication-authorization generated by the mobile communication terminal when being connected to the application service terminal is also provided.

Other than the above authentication-authorization architecture for a single mobile communication terminal, the invention further provides multi-terminal authentication-authorization architecture derived from combining multiple terminal authentication-authorization systems. The architecture is used to accelerate increasing security and reliability of the entire authentication-authorization mechanism on an application service requiring a layered authentication-authorization.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and which thus is not limitative of the present invention, and wherein:

FIGS. 2a to 2f are schematic views of the encoding terminal generating and updating the code data according an embodiment of the present invention;

FIGS. 8a to 8b are schematic views of the code data when the system executes multiple authentication-authorizations according to the present invention.

DETAILED DESCRIPTION OF THE INVENTION

An authentication-authorization system and the method therefore provided by the present invention are carried out under Mobile Internet architecture. The relevant technical content about the basic architecture, message transmission, and data encryption/decryption of the Mobile Internet is provided in conventional technology, and is not the technical feature of the present invention, thus it will not be described herein.

Figure 1A:
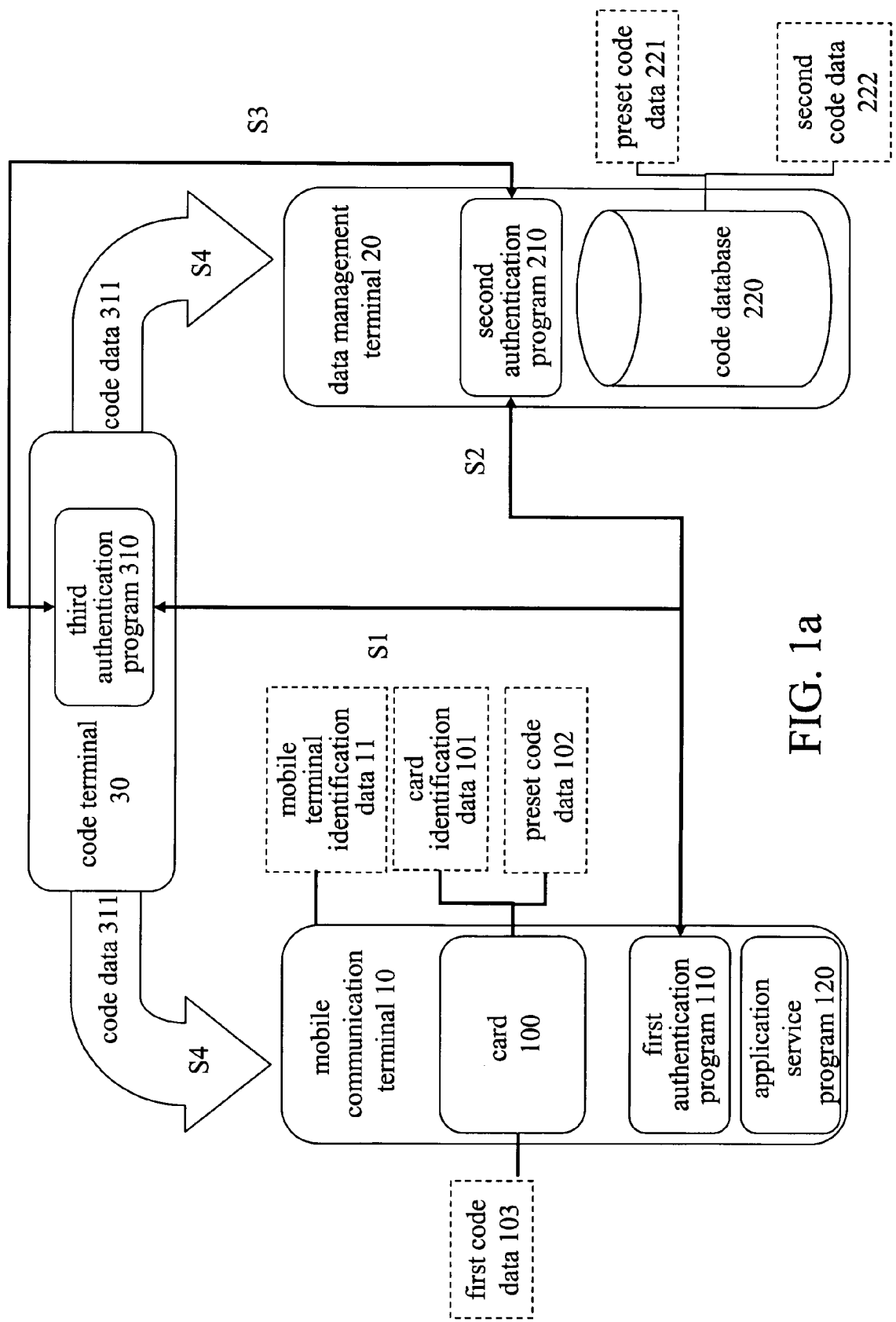
FIGS. 1a, 1b, and 1c are schematic views of the system initialization according to the first, second, and third embodiments of the present invention respectively.
Figure 1B:
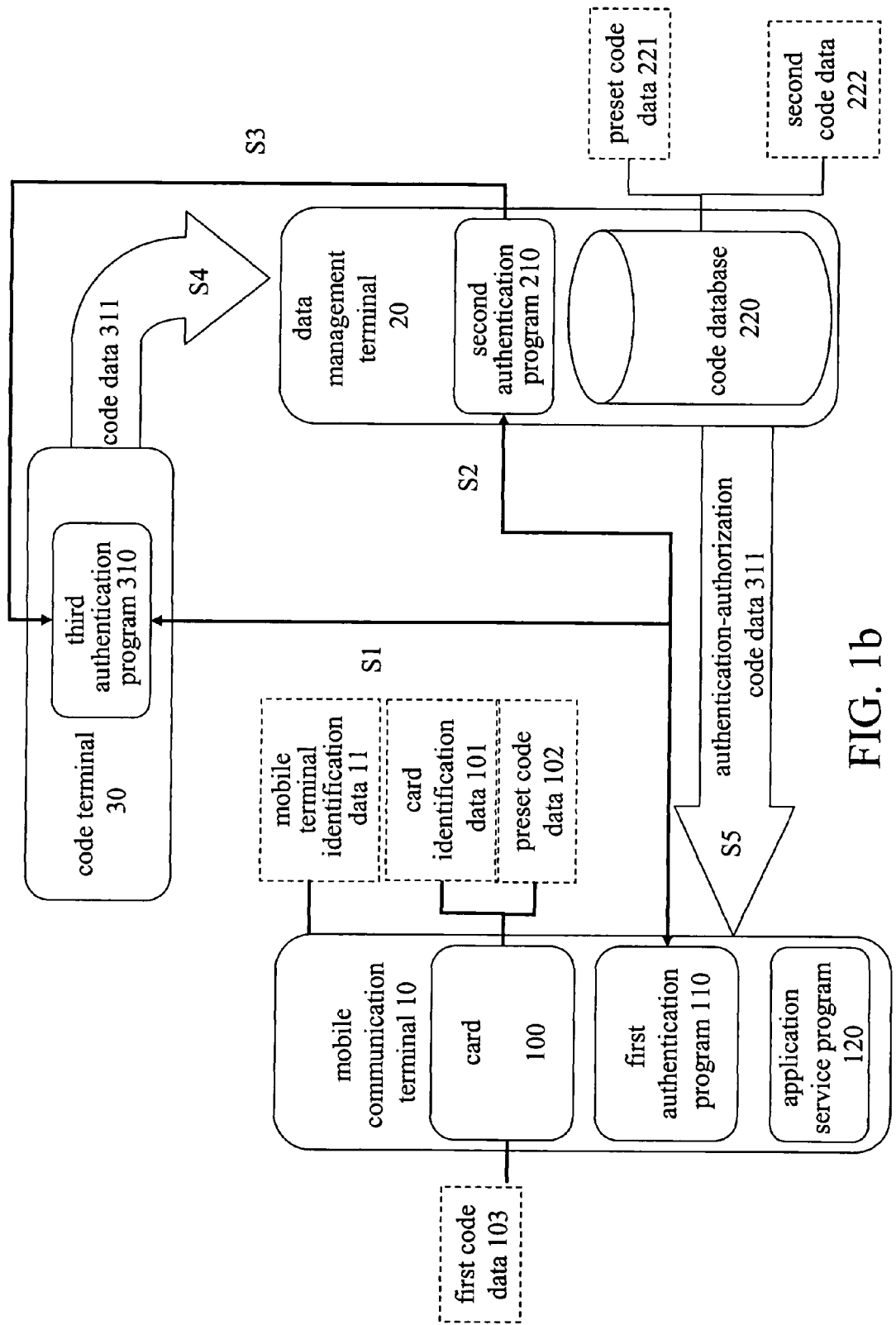

Referring to FIGS. 1a and 1b, the technical content about the initialization of the mobile communication terminal authentication system according to the present invention is illustrated.

FIG. 1a is illustrated as a first embodiment, wherein the system comprises a mobile communication terminal 10, a data management terminal 20, an encoding terminal 30 at different ends, and a card 100 used to activate a connect state.

The mobile communication terminal 10, the data management terminal 20, and the encoding terminal 30 all comprise a computer software program for executing the authentication-authorization, a first authentication program 110, a second authentication program 210, and a third authentication program 310 in sequence. The mobile communication terminal 10 has an exclusive mobile terminal identification data 11, i.e. the International Mobile Equipment Identity (IMEI), for identifying the mobile communication terminal 10. Many application service programs 120 are built in the mobile communication terminal 10, and each of them provides a corresponding application service, such as a network transaction application service program connected to an E-business terminal for carrying out an E-business cash flow, information flow, or logistics operation, a network financial transaction application service program connected to a network banking terminal for carrying out a network financial transaction, a website login application service program connected to a website servo terminal for executing a website login application service, a network download application service program connected to a network download terminal for carrying out a network download application service, a document upload/download application service program connected to a document file transmission terminal for carrying out document receipt-and-forwarding application service, an identification application service program connected to an access security terminal for carrying out an access control application service, or a network upload application service program connected to a network upload terminal for carrying out a network upload application service. The card 100 has a card identification data 101 and a preset code data 102. The card 100 can be the Subscriber Identity Module (SIM) widely used in the present mobile phone or a chip card. The card identification data 101 may be an International Mobile Station Identity (IMSI) in the mobile phone application, or a Temporary Mobile Subscriber Identity (TMSI) assigned by a Visitor Location Buffer (VLR) to replace the IMSI after presenting a connect state. Usually the card identification data 101 are dynamically allocated when the card 100 is placed in the mobile communication terminal 10 and activates a connection. The data management terminal 20 comprises a code database 220 for storing the preset code data 221 the same as the one in the card 100 and other code data.

When activating the mobile communication terminal 10 and installing the card 100 to make the mobile communication terminal 10 in a first connect state, the mobile communication terminal 10 will execute the first authentication program 110 to transfer the mobile terminal identification data 11 to a third authentication program 310 of the encoding terminal 30, so as to carry out the third authentication-authorization for the mobile communication terminal 10 (Step S1). The first authentication program 110 reads out the card identification data 101 and the preset code data 102 of the card 100, and transfers them to the second authentication program 210 of the data management terminal 20 together with the mobile terminal identification data 11, to carry out the authentication-authorization for the mobile communication terminal 10 (Step S2). When the mobile communication terminal 10 passes the authentication-authorization of the encoding terminal 30 and the data management terminal 20, with the mobile communication terminal 10 continuously staying connected, the second authentication program 210 sends a request to the third authentication program 310 (Step S3), for starting continuously generating and transferring the code data 311 to the first authentication program 110 and storing the code data 311 in the card 100 for being updated to a first code data 103 and transferring the code data 311 to the second authentication program 210 for being updated to a second code data 222 (Step S4), and store it in the code database 220. Thus, an entire initialization is completed, and then the first authentication program 110 can accept a call from any application service program 120 in the mobile communication terminal 10 at any time to execute the authentication-authorization.

The part of the third authentication program 310 generating the code data continuously can determine how to allocate times of transferring the code data 311 to the first authentication program 110 and the second authentication program 210 according to an actual data flow.

To ensure that the mobile communication terminal 10, the data management terminal 20, and the encoding terminal 30 are consistent on the time base of carrying out each authentication-authorization, a time synchronization program can be carried out at first among those three (i.e. executing a time synchronization program among the first authentication program 110, the second authentication program 210, and the third authentication program 310) when the application service program 120 requests an authentication-authorization. After time synchronization is completed, a synchronized reference time point is stored in the three respectively. Such a reference time point will be confirmed before each time when carrying out the authentication-authorization. Under the premise that the reference time points stored by the three are conformed to be consistent, the subsequent authentication-authorization is carried out.

In Step S4, the second code data 222 transferred to the data management terminal 20 is stored in the code database 220. In order to reduce the chance of the stored code data being stolen and copied by those who intend to crack the mechanism, the access the first code data 103 and the second code data 222 can be encrypted/decrypted through other random encoding/decoding algorithm (not shown) by using different encryption/decryption standards (a symmetric encryption/decryption standard or an asymmetric encryption/decryption standard) at the mobile communication terminal 10 and/or the data management terminal 20, so as to enhance the security when storing the code data.

To prevent the reference time point to be stolen and copied, other than the reference time point recorded and stored when executing the authentication-authorization program, a time synchronization program is instantly carried out on the mobile communication terminal 10, the data management terminal 20, and the encoding terminal 30 through the encoding terminal 30 in an aperiodic and random manner (or by the data management terminal 20 driven by the encoding terminal 30), to reduce the chance of the reference time point being stolen and copied. Meanwhile, spot-check and authenticate the validity of the reference time point in an aperiodic and random manner, so as to eliminate the chance of malicious interference and destruction in transmission. Once the reference time points spot-checked and authenticated are found to be inconsistent in the authentication-authorization process, another management-and-control terminal 50, at a sixth end, connected to the system of the present invention will determine the risk mode through a data comparison, distinguishing the users and administrators at each different terminal on information security risk, sorting out different illegal behavior and criminal patterns immediately, and executing the subsequent necessary measures.

FIG. 1b shows the initialization according to a second embodiment. The difference is that the code data 311 is generated by the encoding terminal 30 is just transferred to the data management terminal 20 in the Step S4, and then forwarded directly to the mobile communication terminal 10 by the second authentication program 210 to store the code data 311 in the card 100 (Step S5). Such a transfer mode for the code data 311 can also be applied to the operations described below.

Figure 1C:
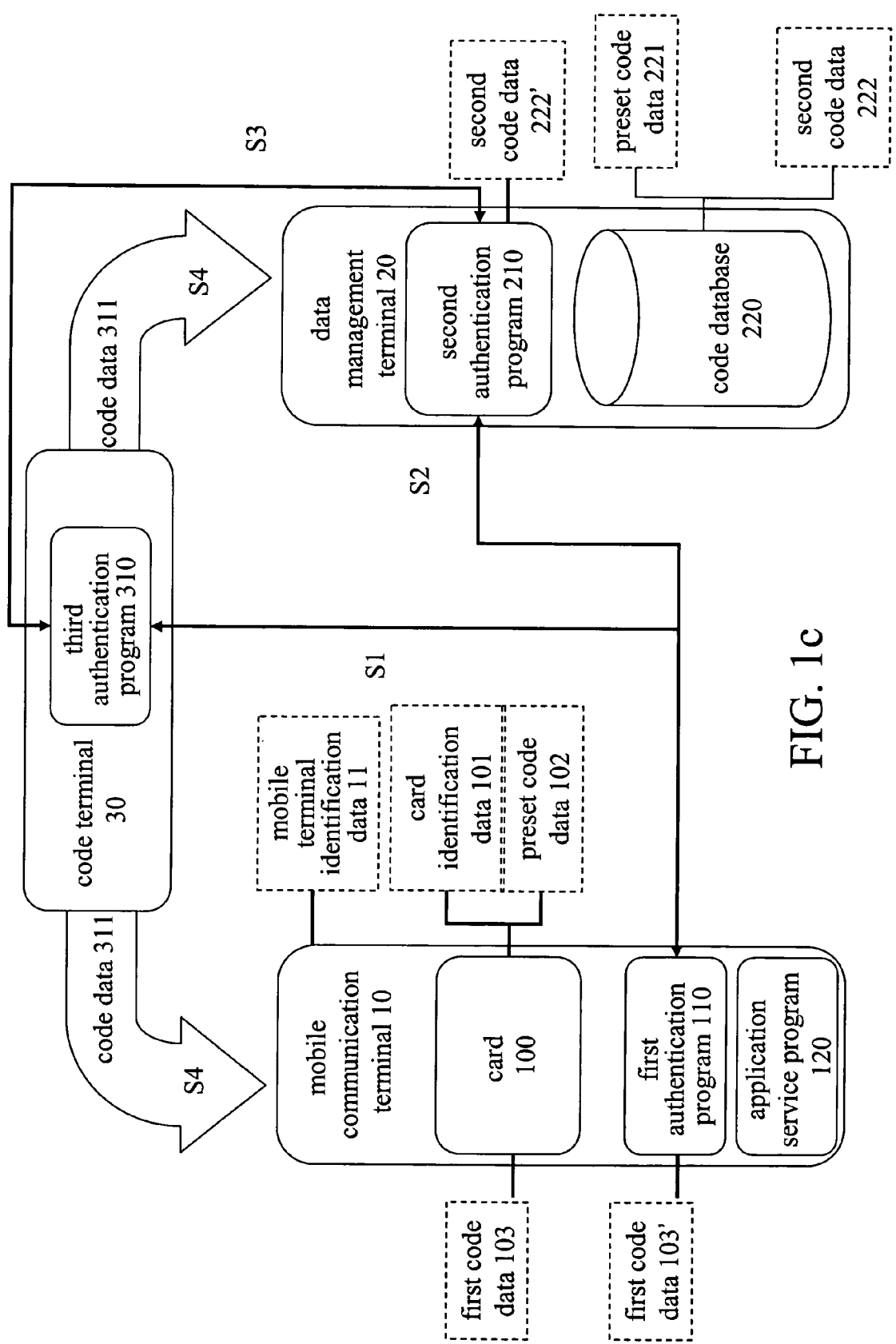

FIG. 1c is a schematic view of the initialization according to a third embodiment. The operation manner of the first authentication program 110 of FIG. 1c is different from the FIG. 1a.

In Step S4, when the encoding terminal 30 transfers the code data 311 to the first authentication program 110 of the mobile communication terminal 10, to prevent the code data 311 from being hooked completely during the transmission thus causing a problem with security, besides using the aforementioned encryption/decryption technology in the transmitting and receiving process to safely accessing the code data 311, a random allocation can also be carried out to the code data 311 transferred by the encoding terminal 30 through the first authentication program 110. The randomly selected code data 311 is divided into two parts. The first part is written in the card 100 to form a first code data 103 as shown above, and the second part is stored in a memory (not shown) to form a first code data 103'. Such initialization operation facilitates carrying out a management-and-control on the security by using aforementioned first code data 103' of the second part when a subsequent case of offline, signal interruption, or weak signal leads to an environment in which it cannot resume connection successfully.

Of course, the operation manner of the data management terminal 20 can be the same, i.e. when the encoding terminal 30 transfers the code data 311 to the second authentication program 210 of the data management terminal 20, a random allocation of the code data 311 transferred by the encoding terminal 30 can be carried out through the second authentication program 210. The randomly allocated code data 311 is also divided into two parts. The first part is written in the code database 220 to form a second code data 222, and the second part is stored in other storage region (not shown) in the data management terminal 20 to form a second code data 222'. Such initialization operation facilitates carrying out a management-and-control on the security by using aforementioned second code data 222' of the second part when a subsequent case of offline, signal interruption, or weak signal leads to an environment in which it cannot resume connection successfully.

As shown in the above Step S4, the code data 311 produced by the third authentication program 310 of the encoding terminal 30 will be used to update the first code data 103 of the mobile communication terminal 10 and the second code data 222 of the data management terminal 20. In order to reduce the chance of causing a loss of data when the code data is stolen and copied, a randomly selective update manner is adopted to update the encoding terminal 30 to reinforce the guard, and also the updated time point can be randomly determined by the third authentication program 310, referring to FIGS. 2a to 2f for illustration.

Figure 1D:
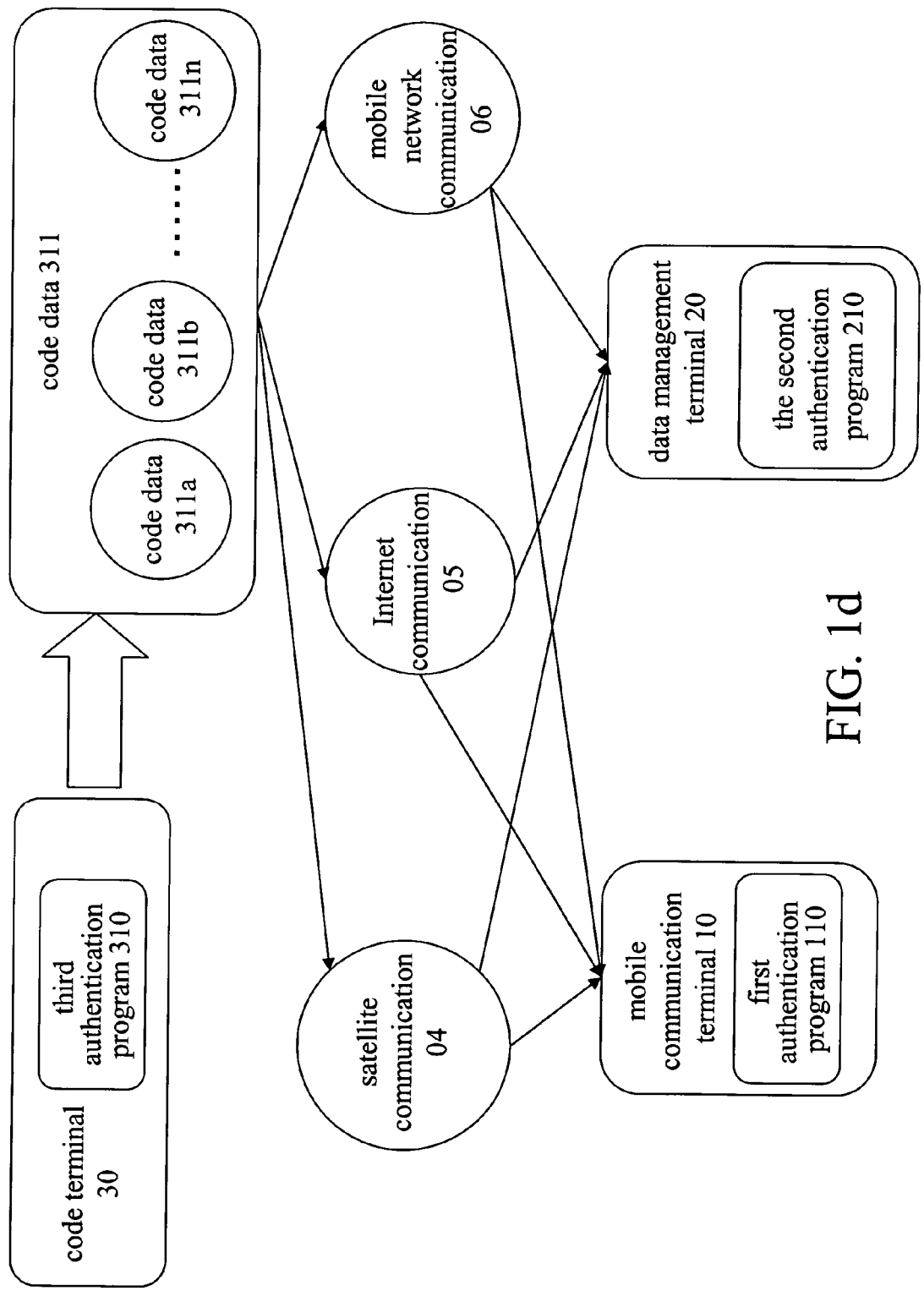
FIG. 1d is a schematic view of an encoding terminal randomly splitting the code data for transmitting and the updating of the reverted code data according to the present invention.

Otherwise, to reduce the problem that the code data 311 generated by the encoding terminal 30 is hooked and copied during being transferred to the mobile communication terminal 10 and the data management terminal 20, the code data 311 transferred by the encoding terminal 30 is split in a random manner, and then transferred to the mobile communication terminal 10 and the data management terminal 20 through different data transmission channels respectively, and then reverted for use. The whole split and revert technology can be achieved by accurately control the time point for transmitting and receiving through a time control manner, as shown in FIG. 1d, such that the chance of being hooked and cracked successfully during data transmission can be significantly reduced.

The pattern of splitting the code data 311 into several different pieces of code data (e.g. code data 311a, code data 311b and code data 311n) depends on, for example, different data lengths, different fields selected from the code data 311, or different data bits. As seen from the present feasible technology, channels for the data transmission include satellite communication 04, Internet 05, mobile telecommunication network 06, and so on, but are not limited to these. The encoding terminal 30 determines which and how many data transmission channels are selected to carry out the data transmission in a random manner.

In FIGS. 2a to 2f, the first code data 103 in the mobile communication terminal 10 and the second code data 222 in the data management terminal 20 are listed for comparison.

Figure 2D:

Basically, the code data originally stored in the mobile communication terminal 10 and data management terminal 20 can be updated in a single data accumulation mode (directly updating one and adding it at the end as shown in FIG. 2a), a multi-data-block update mode (accumulating three at once and adding them at the end as shown in FIG. 2b), or an all-data-block update mode (updating all data at once as shown in FIG. 2c), and also can be updated through a random-deletion update mode (as shown in FIGS. 2d and 2e). FIGS. 2d and 2e are illustrated.

In FIG. 2d, the third authentication program 310 determines to carry out updating at a randomly generated time point, and deletes the first, third, fourth, and eighth data in the original first code data 103 and the original second code data 222. Four code data are added after the deleted data are replaced by follow-ups, to form an updated first code data 103 and an updated second code data 222, as shown in FIG. 2e. In such update manner, the update time and update mode are both generated randomly. Therefore, even if the code data is stolen and copied directly, it cannot be used to carry out authentication-authorization as long as it is re-updated, such that security is significantly increased.

If it requires further increasing the complexity of the authentication-authorization and elevating the information security level, a random update mechanism can be implemented in field units. Under such aspect of implementation, the first code data 103 in the mobile communication terminal 10 and the second code data 222 in the data management terminal 20 may include at least two fields (as shown in FIG. 2f, the first code data 103 and the second code data 222 both includes a first field and a second field). Different from the aforementioned FIGS. 2a to 2e, the random update manner herein is in a unit of row other than field. This update manner refers to randomly selecting the field and row to be updated in a randomly confirmed time through the third authentication program 310, so as to update according to the randomly generated content. Referring to FIG. 2f, for example, the third authentication program 310 randomly selects the third data of the first field of the first code data 103 and the second code data 222, the fifth data of the first field and the second field in the first code data 103 and the second code data 222, and the seventh data of the second field in the first code data 103 and the second code data 222 for updating. In such a way, with the complexity of randomly selecting fields, the chance of the generated code data being stolen and copied completely is significantly reduced.

Figure 3A:
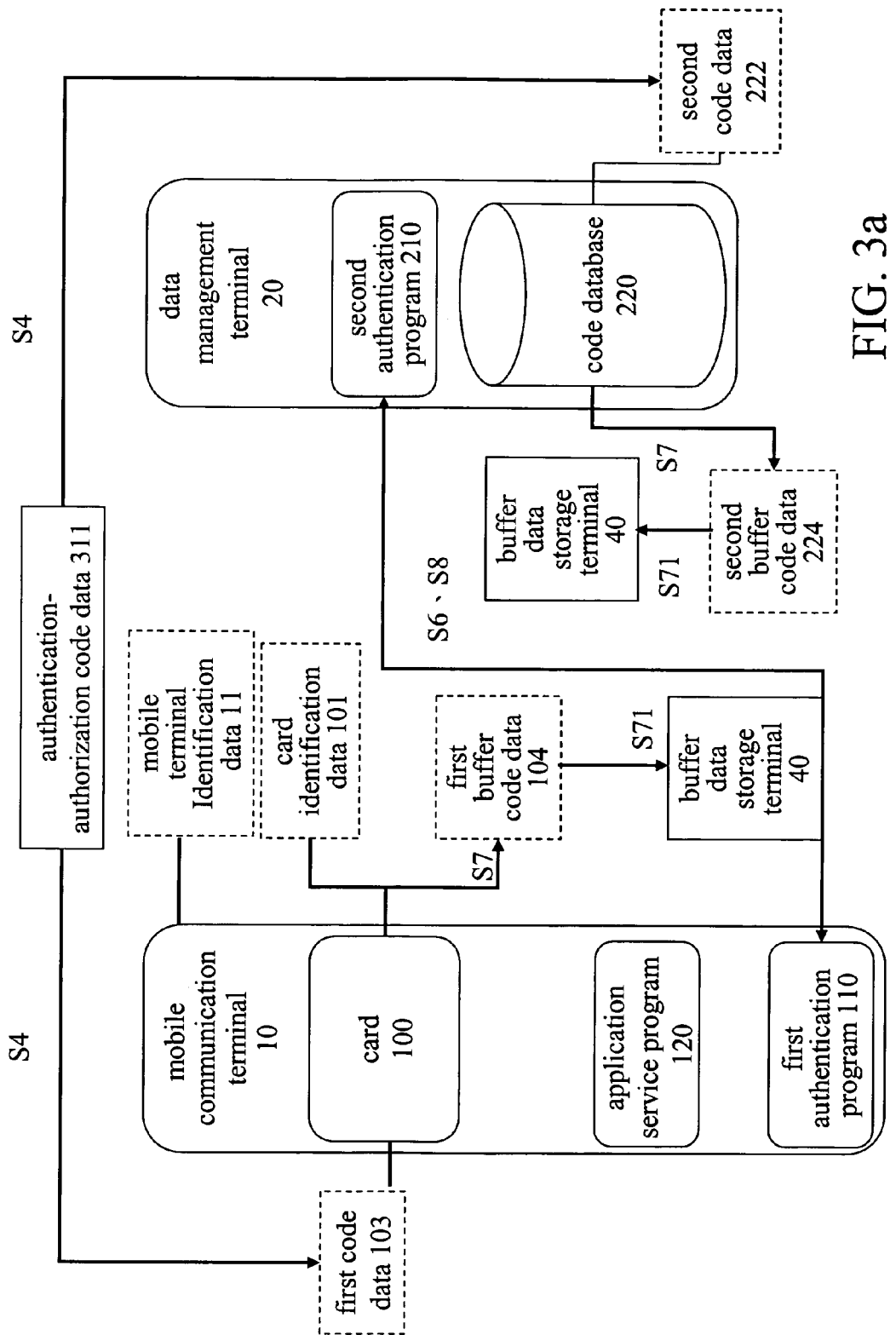
FIGS. 3a and 3b are operational schematic views when the system executes an authentication-authorization for the application service program according to the first and second embodiments of the present invention respectively.

FIG. 3a is an operational schematic view of the authentication-authorization generated when the mobile communication terminal 10 executes the application service program 120 according to the first embodiment of the present invention. At this time, the aforementioned Step S4 is still going on when staying connected. When the application service program 120 needs to execute the authentication-authorization, the first authentication program 110 and the second authentication program 210 execute time verification and randomly appoint a data buffer time point (Step S6). When reaching the data buffer time point, the first authentication program 110 and the second authentication program 210 will buffer respective data in sync, i.e. store the first code data 103 in the card 100 as a first buffer code data 104 and the second code data 222 in the data management terminal 20 as a second buffer code data 224 (Step S7). After complete buffering, the first authentication program 110 transfers the first buffer code data 104 together with the card identification data 101 and the mobile terminal identification data 11 to the second authentication program 210 for comparison with the second buffer code data 224, so as to determine the authentication-authorization result. If matching, the first authentication program 110 is authorized to allow the application service program 120 making a request to proceed (Step S8).

In fact, in Step S8, the part of comparing the first buffer code data 104 with the second buffer code data 224 can be accomplished by communicating between the first authentication program 110 and the second authentication program 210 to extract a part of data from the first buffer code data 104 and the second buffer code data 224 for comparison through a random extraction. It can be used to further prevent the entire code data from being easily stolen and copied by those who intend to crack the mechanism, succeeding in authentication-authorization.

Furthermore, to guarantee the integrity of the code data at each transaction and facilitate being used in other future checks, the aforementioned first buffer code data 104 or the second buffer code data 224 can be backed up. Taking FIG. 3a as an example, the first buffer code data 104 and the second buffer code data 224 are copied to the buffer data storage terminal 40, at a seventh end, connected to the mobile communication terminal 10 and copied to the buffer data storage terminal 40 connected to the data management terminal 20 respectively (Step S71).

Figure 3B:
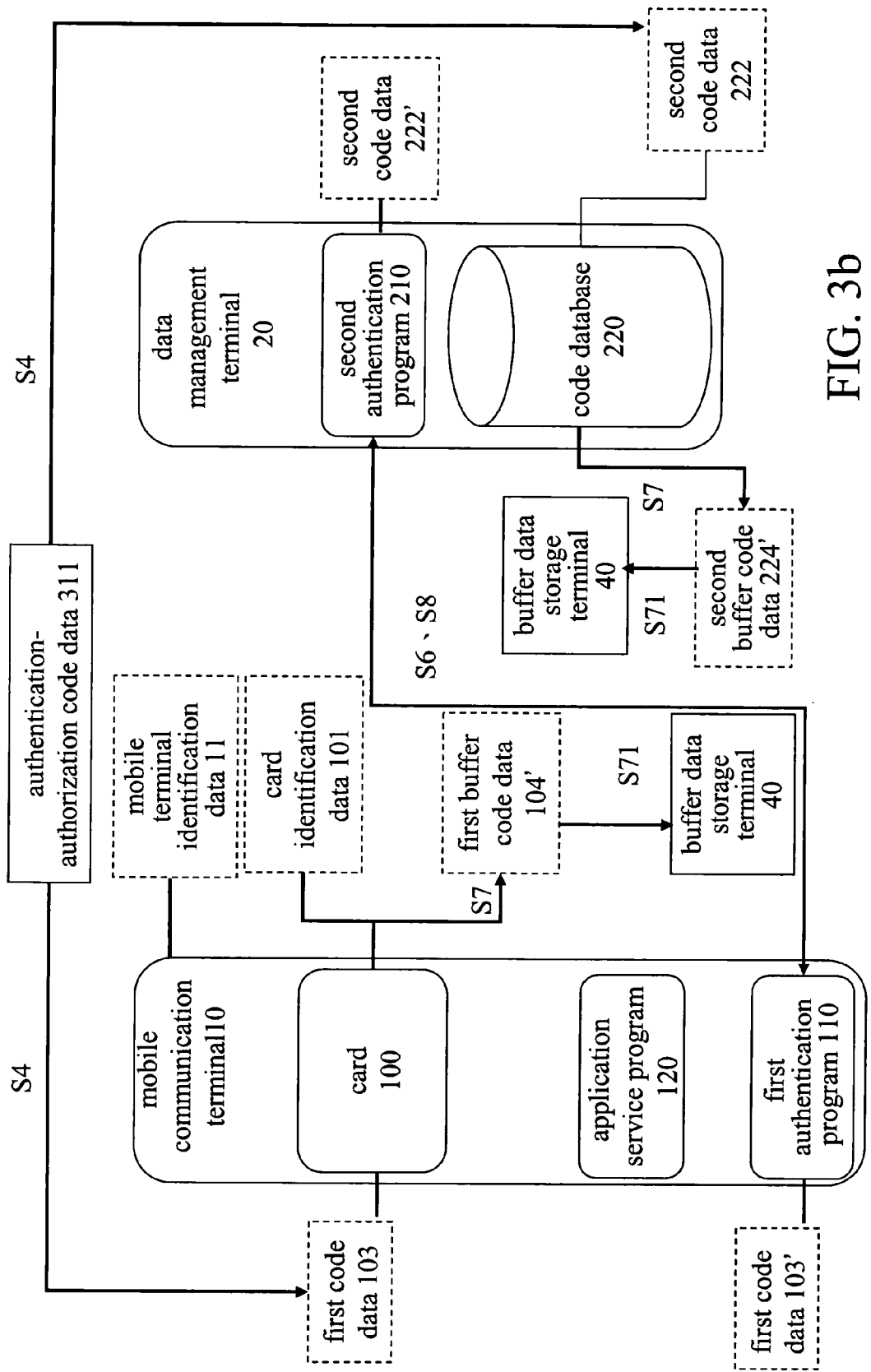

FIG. 3b is a schematic view of an operation of the authentication-authorization generated when the mobile communication terminal 10 executes the application service program 120 according to the second embodiment of the present invention. Compared with FIG. 3a, the manner of generating the first buffer code data 104 and the second buffer code data 224 is different, i.e. part of Step S7 is different.

The second embodiment is implemented mainly based on the precondition of aforementioned FIG. 1c. For mobile communication terminal 10, so-called first buffer code data 104' are randomly selected from the first code data 103 in the card 100 and the first code data 103' stored in memory respectively. And on the data management terminal 20, so-called second buffer code data 224' is generated from the second code data 222 in the code database 220 and the second code data 222' stored in another storage region respectively.

Figure 4A:
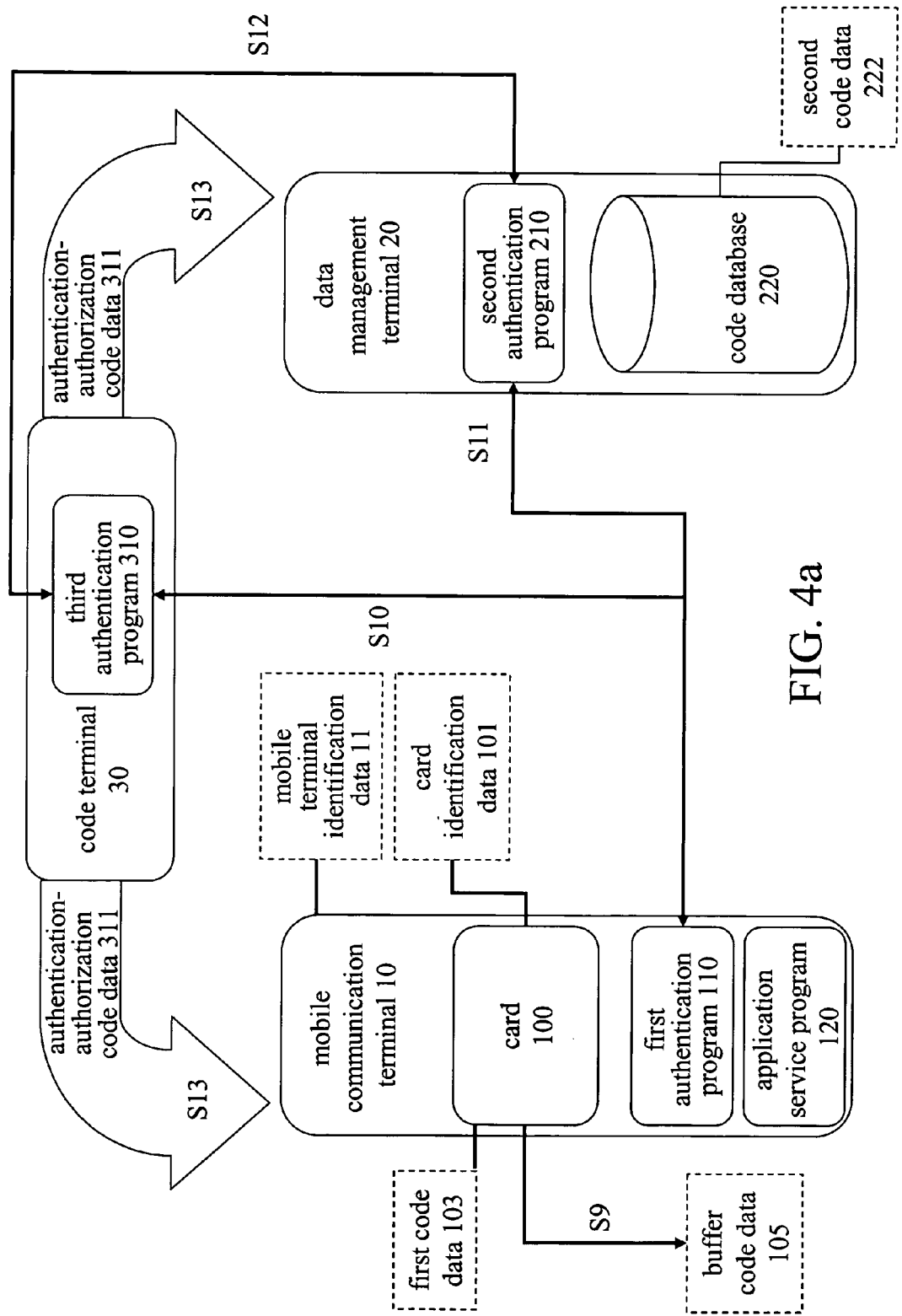
FIGS. 4a and 4b are operational schematic views when the system resumes connection from a disconnect state according to the first and second embodiments of the present invention respectively.

Sometimes, due to the signal strength or signal range, signal temporarily interruption or signal suspension may occur to the mobile communication 10 easily. At this time, the operation manner of the authentication-authorization for the mobile communication terminal of the present invention is as shown in FIG. 4a. At first, the third authentication program 310 ceases generating the code data 311 (i.e. stops the program of the original Step S4). Then an action of buffering the data starts at the part of the mobile communication terminal 10. At this time, the card 100 buffers the present reserved first code data 103, to form a buffer code data 105, and waits for resuming connection (Step S9). When the mobile communication terminal 10 resumes connection, the mobile communication terminal 10 must re-gain the authentication-authorization from the encoding terminal 30. At this time, the first authentication program 110 will re-transfer the mobile terminal identification data 11 to the third authentication program 310 of the encoding terminal 30, to carry out the authentication-authorization for the mobile communication terminal 10 (Step S10). After confirming obtaining the approval of the encoding terminal 30, the first authentication program 110 continues to read the card identification data 101 and the buffer code data 105 of the card 100, and then transfers them together with the mobile terminal identification data 11 to the second authentication program 210 of the data management terminal 20 for carrying out the authentication-authorization for the mobile communication terminal 10 (Step S11). After confirming that the mobile communication terminal 10 passes the authentication-authorization of the encoding terminal 30 and the data management terminal 20 respectively, the second authentication program 210 sends a request to the third authentication program 310, and then begins to generate the code data 311 continuously (Step S12). Then, the code data 311 is transferred to the first authentication program 110 and stored in the card 100 as a new first code data 103, and transferred to the second authentication program 210 as the second code data 222 through the third authentication program 310. At this time, the stage of authentication and authorization can be resumed, so the first authentication program 110 can accept the call from the application service program 120 to execute authentication-authorization at any time (Step S13).

In actual operation, in order to prevent those who intend to crack the mechanism from doing some tricks with the data management terminal 20 when in a disconnection stage, a random encoding/decoding algorithm in the data management terminal 20 is required to make an alternation for the encryption/decryption standard, each time when the mobile communication terminal 10 is in a disconnect state. As such, when resuming connection subsequently, the data management terminal 20 can adopt an encryption/decryption standard different from the former one to ensure the security of the data storage.

Figure 4B:
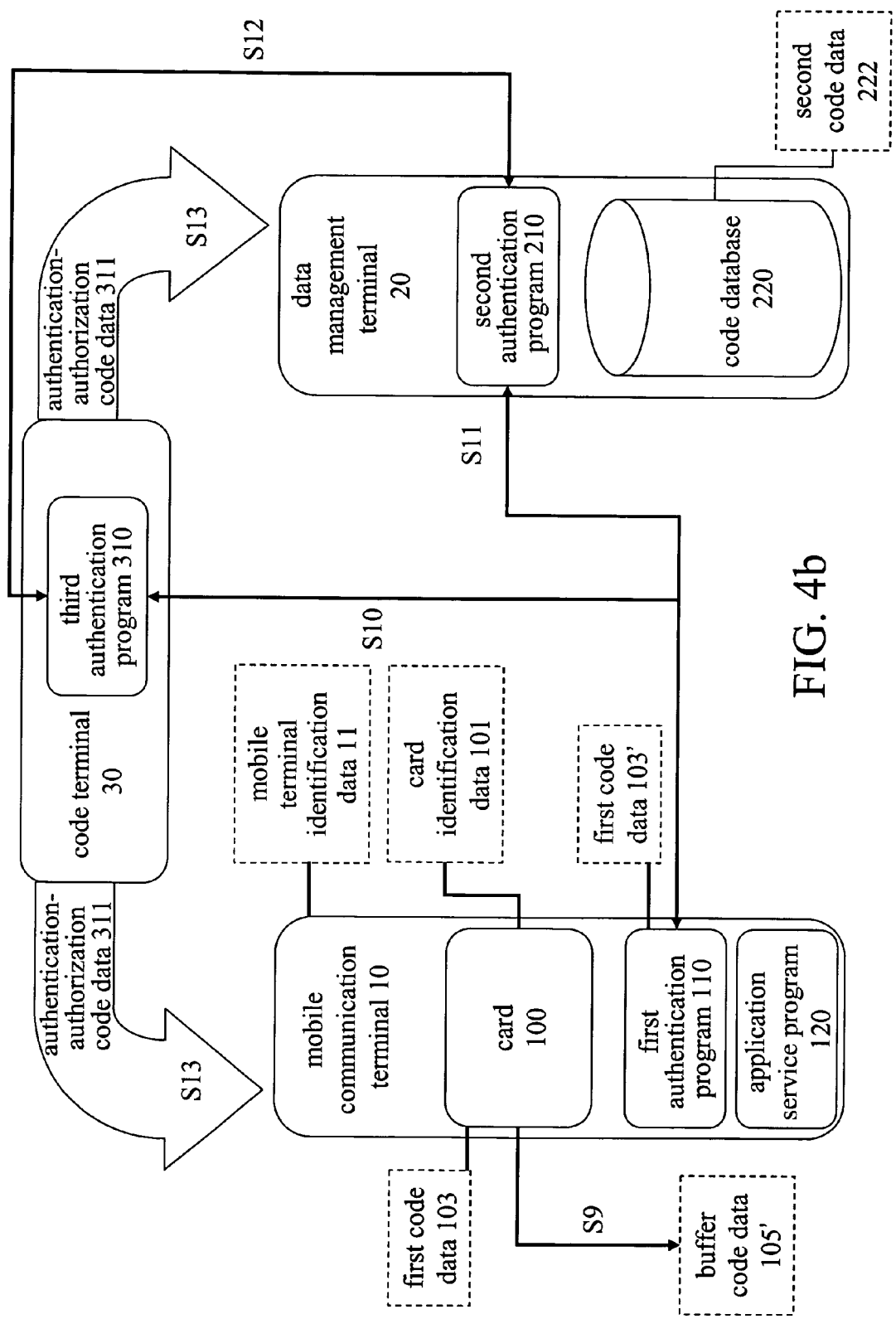

Also, in order to prevent those who intend to crack the mechanism from stealing and copying the code data stored in the mobile communication terminal 10 completely and causing trouble about the whole information security, based on the precondition of FIG. 1c, when in the disconnect state, in Step S9 the first code data 103' stored in the memory is added to the first code data 103 in the card 100 in a random selection manner by using the first authentication program 110, for forming so-called buffer code data 105', so as to wait for resuming connection, referring to FIG. 4b for description. When the mobile communication terminal 10 resumes connection, a reversion process is carried out through the first authentication program 110, reverting to the original first code data 103, and the subsequent steps are the same as FIG. 4a.

There are two aspects of the implementation of generating the buffer code data 105'. Besides being generated through the aforementioned first authentication program 110 in the mobile communication terminal 10, the buffer code data 105' can be generated through the third authentication program 310 in the encoding terminal 30 driven by the first authentication program 110. In this aspect of implementation, the third authentication program 310 transfers the random selection result for generating the buffer code data 105' to the first authentication program 110 and the second authentication program 210 at each time when transmitting the code data 311 (i.e. Step S4). When the mobile communication terminal 10 is in a disconnect state, the first authentication program 110 then generates the buffer code data 105' according to the last random selection results obtained from the third authentication program 310 before entering the disconnect state. After the buffer code data 105' is generated, the first authentication program 110 will delete such a random selection result (at this time, such a random selection result is reserved only by the second authentication program 210).

When the mobile communication terminal 10 resumes connection, it will firstly transfer the buffer code data 105' together with the mobile telecommunication identification data 11 and the card identification data 101 to the second authentication program 210 of the data management terminal 20 to carry out authentication-authorization for the mobile communication terminal 10. After authentication-authorization, the last reserved random selection results obtained from the third authentication program 310 is transferred to the first authentication program 110 by the second authentication program 210 of the data management terminal 20, such that the first authentication program 110 may reverts the buffer code data 105' into the original buffer code data 105' before disconnecting. After the reversion, the first authentication program 110 of the mobile communication terminal 10 transfers the reverted buffer code data 105' together with the mobile telecommunication identification data 11 and the card identification data 101 to the second authentication program 210 of the data management terminal 20 to carry out the second authentication-authorization action for the mobile communication terminal 10.

Another aspect of implementation enabling the first authentication program 110 to revert the buffer code data 105' to the original buffer code data 105' before the disconnecting, includes directly transferring the last random selection result (or re-generate a new random selection result) to the first authentication program 110 for reversion by the third authentication program 310. Or it also can be achieved through transferring the last random selection result (or re-generating a new random selection result) to the second authentication program 210 by the third authentication program 310, and transmitting the last random selection result obtained from the third authentication program 310 (or re-generating a new random selection result) to the first authentication program 110 for reversion by the second authentication program 210 of the data management terminal 20, when the mobile communication terminal 10 resumes connection.

Through above various implementation aspects, the criminal behavior of illegally altering the data in a disconnect state can be prevented effectively.

Figure 5:
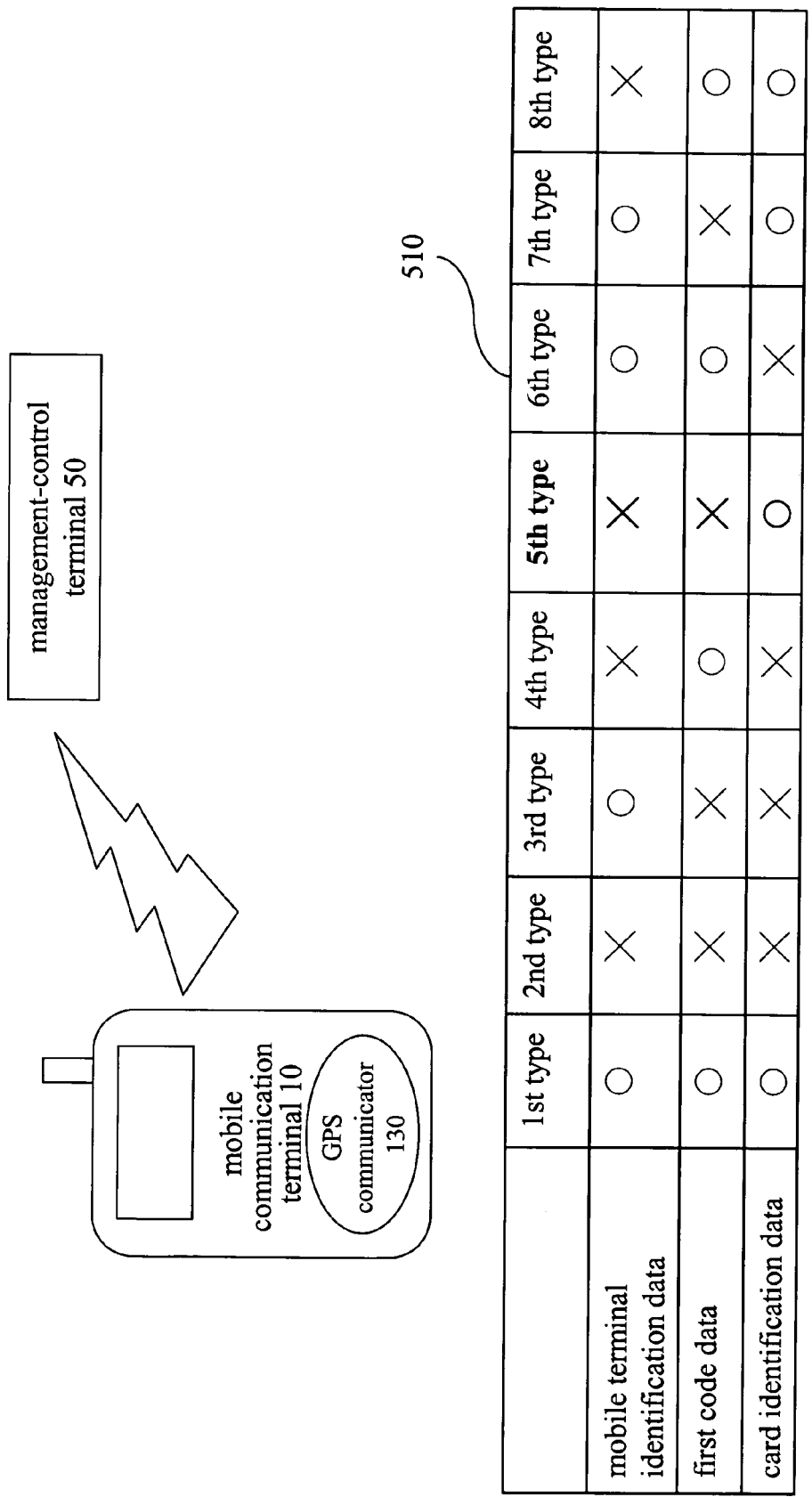
FIG. 5 is an operational schematic view when the system connects a management-and-control terminal for managing and controlling the mobile communication terminal according to the present invention.

In fact, through the above process mechanisms of FIGS. 4a and 4b, provided that the authentication-authorization cannot be passed in Step S10 or Step S11, a certain illegal behavior of those who intend to crack the mechanism may be detected easily, and then through an instant reporting mechanism, the influence to the whole authentication-authorization mechanism caused by the illegal behavior can be reduced significantly. Further, FIG. 5 illustrates the embodiment of the system of the present invention being connected to the remote management-and-control terminal 50 for carrying out the management-and-control. In such an embodiment, the interaction between the mobile communication terminal 10 and the management-and-control terminal 50 is illustrated. Through carrying out an cross comparison of the mobile terminal identification data 11, the card identification data 101 in the card 100, and the first code data 103 buffered by the card 100 during each authentication-authorization process through the management-and-control terminal 50, the validation of the authentication-authorization program can be easily determined. For the fifth situation of the authentication-authorization result 510, besides that the authentication-authorization of the card identification data 101 is passed, the other mobile terminal identification data 11 and the first code data 103 are not accordant. After making a further cross comparison of the three data, actual illegal behavior can be confirmed. Thus the management-and-control terminal 50 can be used to request information from the mobile communication terminal 10 to monitor the illegal behavior. For the present most popular application, a Globe Positioning System (GPS)/Assisted Global Positioning System AGPS communicator 130 in the mobile communication terminal 10 can be used to directly send a relevant position signal, and then the management-and-control terminal 50 confirms the position of the mobile communication terminal 10, to carry out the subsequent action.

In fact, the management-and-control terminal 50 can be connected to any end of this system via the communication network. No matter whether authentication-authorization cannot be carried at any end, through the data comparison, a distinction can be made on the security risk to users and administrators at any terminal, and different illegal behavior and criminal patterns can be distinguished immediately, such that before legal users suffer an actual loss, necessary security measures can be taken. The part described above involved in the present invention can provide actual application functionality, which is not intended to limit the possible application fields and application categories of the management-and-control terminal 50.

However, the aforementioned authentication-authorizations are all based on the situation caused by the mobile communication terminal 10 executing its application service program 120. In fact, in some applications, the authentication-authorization system of the present invention can be applied when the mobile communication terminal 10 is connected to the other application service terminal 60, such as when it is connected to an auto stored-value/pay machine at point-of-sale, an auto ticketing machine, an auto transfer machine (ATM) for carrying out a financial transaction service, a media download terminal to download/upload and transfer the multimedia content to other multimedia terminals (such as computers, digital TVs) at a fifth end for outputting, or an electronic lock to manage and control, the document file download/upload terminal to output the document file content, or the software file download/upload terminal to install/uninstall or output the software file content. Such architecture is also constructed based on the mobile Internet architecture. The first connect state of the entire system can be achieved by adopting the technical content as FIGS. 1a to 1d, while the operation mechanism in the disconnect state can be achieved by adopting the aforementioned technical content as in FIGS. 4a and 4b. The main difference of operation is in the actual authentication-authorization flow generated after adding the application service terminal 60, which is illustrated as follows.

Figure 6:
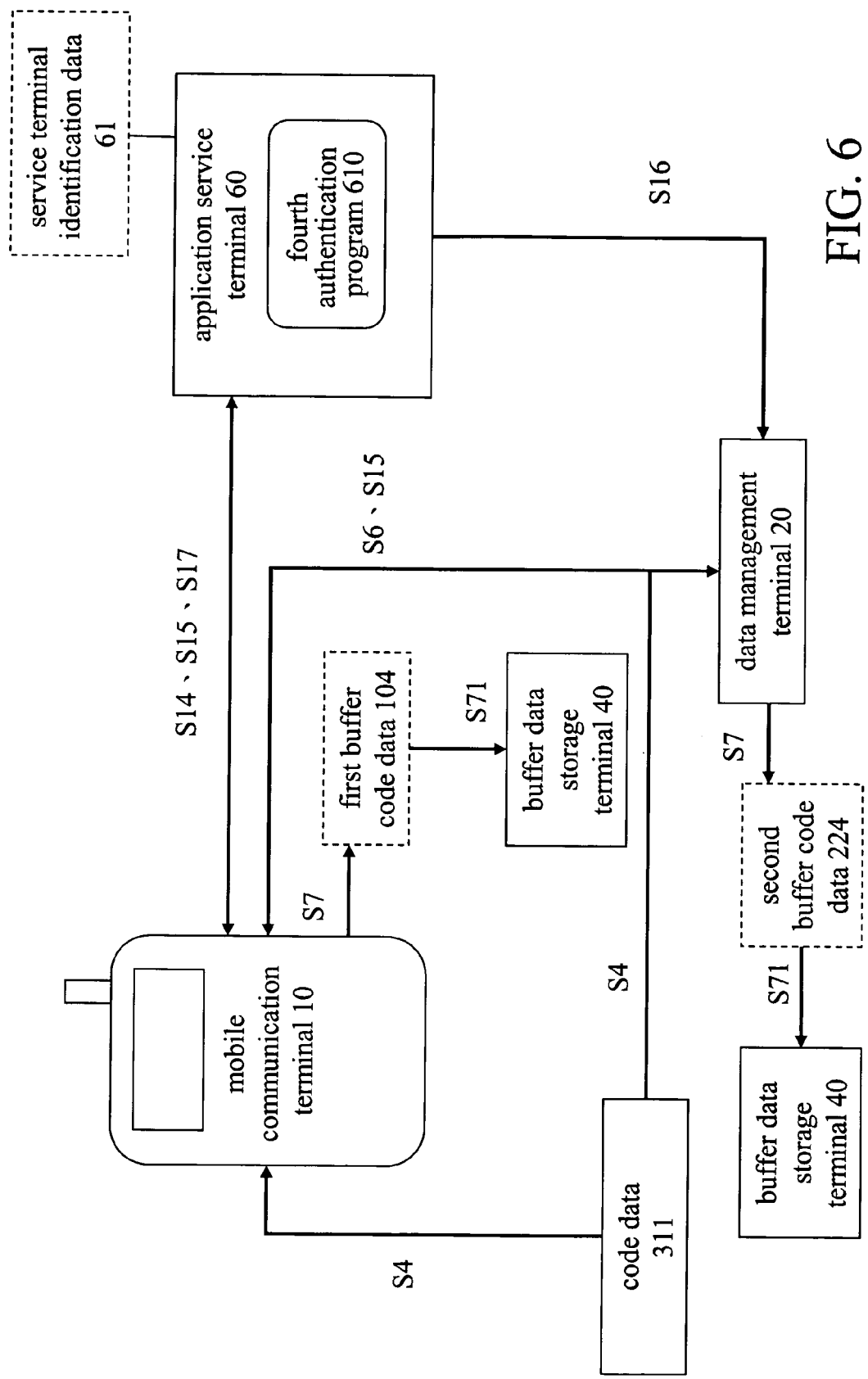
FIG. 6 is an operational schematic view when the system connects an application service terminal for executing the authentication-authorization according to the present invention.

This operation manner is as shown in FIG. 6. After the initialization under the first connecting state is completed, the operation flow of Step S4 proceeds. A service terminal identification data 61 on the application service terminal 60 is used to identify the application service terminal 60 in the authentication-authorization process. Furthermore, the application service terminal 60 also includes a fourth authentication program 610 for executing the relevant procedure of the authentication-authorization. When the mobile communication terminal 10 is connected to the application service terminal 60 and requires providing an application service, the application service terminal 60 will require the mobile communication terminal 10 to request an authentication-authorization (Step S14). At this time, as mentioned above, the first code data 103 together with the card identification data 101 and the mobile terminal identification data 11 are transferred to the second authentication program 210 and the fourth authentication program 610 respectively by the first authentication program 110, and compared with the second buffer code data for the first time by the second authentication program 210 (Step S15). The first code data 103 together with the card identification data 101 and the mobile terminal identification data 11 together with the service terminal identification data 61 are transferred to the second authentication program 210 by the fourth authentication program 610 for carrying out a second comparison with the second buffer code data, and the authentication-authorization result is determined by the second authentication program 210 (Step S16). If matching, the application service terminal 60 making a request will be authorized to continue to provide the application service to the first authentication program 110 (Step S117).

Other than the aforementioned situation in which the application service terminal 60 requires the mobile communication terminal 10 to request an authentication-authorization, when the mobile communication terminal 10 is connected to the application service terminal 60 and requires providing an application service, the application service program 120 also can cooperate with another application program (not shown) to require executing authentication-authorization. For example, if downloading music files from a network, in order to download music, at least four application programs will be executed in the whole operation process, and all the executable programs need an authentication-authorization action, such as personal identification program, transaction confirmation program, payment confirmation program, and money deduction confirmation program. The authentication-authorization for these programs can be achieved through cooperation with aforementioned application service program 120. In fact, the application service terminal 60 also can increase the security of the application service terminal 60 through the random coding and authentication-authorization mechanism the same as those of the aforementioned mobile communication terminal 10 and the data management terminal 20.

Figure 7:
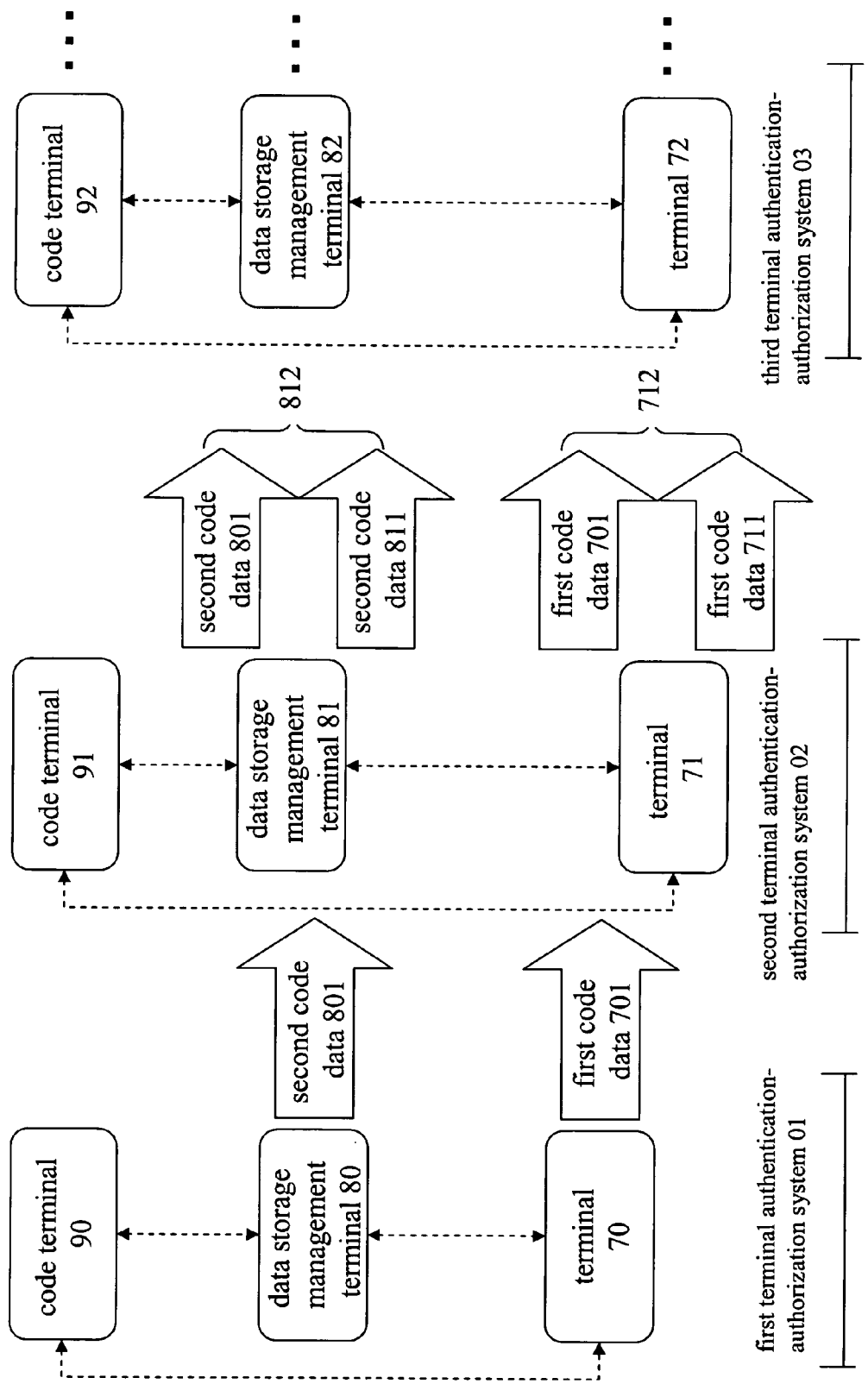
FIG. 7 is an operational schematic view when the system executes multiple authentication-authorizations according to the present invention.

Till now, the authentication-authorization mechanisms provided by the present invention have all been applied in the situation of a single authentication-authorization system. However, in order to enhance the perfect of the authentication-authorization mechanism, multiple authentication-authorization systems can be joined to generate a system with multiple authentication-authorization mechanisms (also called a horizontal authentication-authorization operation), to enhance the security and integrality of the authentication-authorization. The operational schematic view of so-called multi-terminal authentication-authorization system at least comprises two or more terminal authentication-authorization systems (the one as shown in FIG. 7 comprises a first terminal authentication-authorization system 01, a second terminal authentication-authorization system 02, and a third terminal authentication-authorization system 03).

In an embodiment of multi-terminal authentication-authorization system, the first terminal authentication-authorization system 01 can be a Veri Chip system which can be implanted in the human body or a mobile communication fitting terminal such as a Bluetooth earphone. The second terminal authentication-authorization system 02 can be the mobile communication terminal system. And the third terminal authentication-authorization system 03 can be the application service terminal system.

Which terminal authentication-authorization system the above each terminal authentication-authorization system (i.e. 01, 02 and 03) should be connected to is determined by the quality and quantity of required collected evidence on the entire horizontal authentication-authorization operation and the necessity of information security, which is not limited to the present invention.

The first terminal authentication-authorization system 01 includes a terminal 70, a data storage management terminal 80 and a code terminal 90, the second terminal authentication-authorization system 02 includes a terminal 71, a data storage management terminal 81 and a code terminal 91 and the third terminal authentication-authorization system 03 includes a terminal 72, a data storage management terminal 82 and a code terminal 92.

Each terminal authentication-authorization system can operate independently (also called a vertical authentication-authorization operation). The case of independent operation is similar to the above description and will not be described here. The main technical feature will be illustrated in FIG. 7 in accompanying with FIGS. 8a and 8b. When executing a multi-terminal authentication-authorization, at first the first terminal authentication-authorization system 01 is responsible for completing the authentication-authorization of the first stage. Then the first code data 701 and the second code data 801 are transferred to the terminal 71 and the data management terminal 81 of the second terminal authentication-authorization system 02 through the terminal 70 and the data management terminal 80 in the first terminal authentication-authorization system 01. At this time, the terminal of the second terminal authentication-authorization system 02 will join its first code data 711 with the first code data 701 of the terminal 70 of the first terminal authentication-authorization system 01 as the data used in the second-stage authentication-authorization (i.e. the joined first code data 712). Similarly, the data management terminal 81 of the second terminal authentication-authorization system 02 also joins its second code data 811 with the second code data 801 of the data management terminal 80 of the first terminal authentication-authorization system 01 as the data used in the second-stage authentication-authorization (i.e. the joined second code data 812).

As shown in FIGS. 8a and 8b, schematic views of generating the joined first code data 712 used in the aforementioned second-stage authentication-authorization are shown. The first code data 701 and the first code data 711 in FIG. 8a are the code data originally owned by the first terminal authentication-authorization system 01 and the second terminal authentication-authorization system 02 (each having ten code data) respectively. After the first terminal authentication-authorization system 01 completes first-stage authentication-authorization, when the second terminal authentication-authorization system 02 carries out second-stage authentication-authorization, the joined first code data 712 is generated by the combination of the aforementioned first code data 701 and the first code data 711 (with a total of 20 code data), wherein the combination manner is not limited by the description of the present embodiment, and then the 20 code data will be used to carry out the authentication-authorization of the second phase.

The whole multi-terminal authentication-authorization concept is described as above. In fact, it can be varied according to different requirements for the authentication-authorization mechanism. A third terminal authentication-authorization system 03 can be connected after the second terminal authentication-authorization system 02, so as to execute third-stage authentication-authorization. As shown in FIG. 7, an nth-stage authentication-authorization can also be deduced.

In theory, the more stages are executed, the higher the security and integrality of the authentication-authorization will be. In addition to ordinary applications, it can be further applied in natural person organizations, body corporate, legal person institutes, cross-national enterprises, originations and groups, etc., and even the authentication-authorization application of the national security level.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An authentication-authorization system for a mobile communication terminal, applied in a Mobile Internet architecture, the system comprising:

a mobile communication terminal, located at a first end and having a first authentication program for executing the authentication-authorization, a plurality of application service programs which can provide an application service, and a mobile terminal identification data;

a card, optionally installed in the mobile communication terminal and having a card identification data and a preset code data;

a data management terminal, located at a second end, for executing a second authentication program which can provide the authentication-authorization, and a preset code data same as the one in the card; and an encoding terminal, located at a third end, for executing a third authentication program which can provide the authentication-authorization, and being responsible for dynamically generating a code data for the authentication-authorization to the card and the data management terminal continuously and randomly according to a request of the data management terminal;

wherein, after the system activates the mobile communication terminal, and installs the card to make the mobile communication terminal in a first connect state, and completes initialization, when the application service program requests the first authentication program executing authentication-authorization, a data buffer time point is randomly appointed by the first authentication program and the second authentication program, and when reaching the data buffer time point, a first code data of the card and a second code data of the data management terminal are respectively buffered as a first buffer code data and a second buffer code data in sync; after buffering is complete, the first buffer code data together with the card identification data and the mobile terminal identification data is transferred to the second authentication program by the first authentication program for being compared with the second buffer code data to determine the authentication-authorization result; if matching, the first authentication program will be authorized by the second authentication program to allow the requesting application service program to proceed, wherein the process of the system activating the mobile communication terminal and installing the card to make the mobile communication terminal in the first connect state and completing initialization further comprises the mobile communication terminal activating the first authentication program to transfer the mobile terminal identification data to the third authentication program of the encoding terminal, to carry out authentication-authorization of the mobile communication terminal; then the first authentication program reading the card identification data and the preset code data of the card, and transferring them together with the mobile terminal identification data to the second authentication program of the data management terminal to carry out authentication-authorization of the mobile communication terminal; when the mobile communication terminal passes the authentication-authorization of the encoding terminal and the data management terminal respectively, with the mobile communication terminal staying connected, the second authentication program sending a request to the third authentication program for starting continuously generating and transferring the code data to the first authentication program and then storing the code data in the card for being updated to the first code data, and transferring the code data to the second authentication program for being updated to the second code data, such that the first authentication program can accept a call from the application service program to execute authentication-authorization at any time, and wherein the part of the third authentication program continuously generating the code data randomly updates and generates the new first code data and the new second code data in a single data accumulation mode, a multi-data-block update mode, an all-data-block update mode, a random deletion update mode, or a random field update mode.

2. The authentication-authorization system for a mobile communication terminal as claimed in claim 1, wherein the system further comprises that when the mobile communication terminal stops connecting, the third authentication program ceases generating the code data, and at the same time the first code data is buffered by the first authentication program as a buffer code data; when the mobile communication terminal resumes connection, the first authentication program transfers the mobile terminal identification data to the third authentication program of the encoding terminal again, to carry out authentication -authorization of the mobile communication terminal; then the first authentication program reads the card identification data and the buffer code data of the card , and transfers the card identification data and the buffer code data to the second authentication program of the data management terminal together with the mobile terminal identification data, to carry out authentication-authorization for the mobile communication terminal; after the mobile communication terminal passes the authentication-authorization of the encoding terminal and the data management terminal respectively, the second authentication program sends a request to the third authentication program for restarting continuously generating and transferring the code data to the first authentication program and then storing the code data in the card as the first code data, and transferring the code data to the second authentication program as the second code data, such that the first authentication program resumes accepting a call from the application service program to execute authentication-authorization at any time.

3. The authentication-authorization system for a mobile communication terminal as claimed in claim 2, wherein when the mobile communication terminal is in a disconnect state, the second authentication program requires the random encoding/decoding algorithm to randomly change the encryption/decryption standard at the same time.

4. The authentication-authorization system for a mobile communication terminal as claimed in claim 2, wherein when the mobile communication terminal is in a disconnect state, the third authentication program requires the random encoding/decoding algorithm to randomly change the encryption/decryption standard at the same time.

5. The authentication-authorization system for a mobile communication terminal as claimed in claim 2, wherein the buffer code data is randomly selected from the first code data in the memory joined with the first code data in the card by the first authentication program, and is reverted when resuming connection.

6. The authentication-authorization system for a mobile communication terminal as claimed in claim 2, wherein the buffer code data is randomly selected from the first code data in the memory joined with a part of the first code data in the card by the third authentication program, and is reverted when resuming connection.

7. The authentication-authorization system for a mobile communication terminal as claimed in claim 3, wherein the third authentication program further comprises transferring a random selection result to the second authentication program for storage, and transferring the random selection result to the first authentication program by the second authentication program to revert the buffer code data when resuming connection.

8. The authentication-authorization system for a mobile communication terminal as claimed in claim 1, wherein the system further comprises more than one application service terminal, located at a fourth end, for providing different application services and having a service terminal identification data, and executing a fourth authentication program which can provide the authentication-authorization; when the application service terminal provides an application service, a time verification is executed by the first authentication program and the second authentication program and a data buffer time point is randomly appointed, and when reaching the data buffer time point, the first code data in the card and the second code data of the data management terminal are respectively buffered as the first buffer code data and the second buffer code data in sync; after buffering is complete, the first buffer code data together with the card identification data and the mobile terminal identification data are transferred to the second authentication program and the fourth authentication program respectively by the first authentication program; a first comparison with the second buffer code data is carried out by the second authentication program, and then the first buffer code data together with the card identification data and the mobile terminal identification data together with the service terminal identification data are transferred to the second authentication program by the fourth authentication program for a second comparison with the second buffer code data, to determine the authentication-authorization result; if matching, the application service terminal making a request will be authorized to continue providing an application service to the first authentication program.

9. The authentication-authorization system for a mobile communication terminal as claimed in claim 8, wherein the application service terminal is a media download terminal capable of providing a multimedia content to the mobile communication terminal, and the mobile communication terminal further transferring the multimedia content to a multimedia terminal located at the fifth end.

10. The authentication-authorization system for a mobile communication terminal as claimed in claim 8, wherein the application service terminal is a document file download terminal capable of providing a document file content to the mobile communication terminal, and the mobile communication terminal further transferring the document file content to the multimedia terminal located at the fifth end.

11. The authentication-authorization system for a mobile communication terminal as claimed in claim 8, wherein the application service terminal is a software file download terminal, which can provide a software file content to the mobile communication terminal, and the mobile communication terminal further transferring the software file content to the multimedia terminal located at the fifth end.

12. The authentication-authorization system for a mobile communication terminal as claimed in claim 1, when the application service program requests the first authentication program executing the authentication-authorization, further comprising the second authentication program requiring the first authentication program and the third authentication program to execute the time synchronization program, to generate a reference time point as a time reference when carrying out authentication-authorization.

13. The authentication-authorization system for a mobile communication terminal as claimed in claim 1, wherein the third authentication program further comprises randomly determining a split pattern of the code data for splitting the code data, and transferring the split code data to the first authentication program and the second authentication program through more than one data transmission channel respectively for reverting the split code data to the code data.

14. The authentication-authorization system for a mobile communication terminal as claimed in claim 13, wherein the split pattern is selected from a group consisting of data length, data field, and data bits.

15. The authentication-authorization system for a mobile communication terminal as claimed in claim 13, wherein the data transmission channel is selected from a group consisting of a satellite communication, an Internet communication, and a mobile network communication.

16. The authentication-authorization system for a mobile communication terminal as claimed in claim 1, wherein the first code data is directly received from the second authentication program or from the third authentication program.

17. The authentication-authorization system for a mobile communication terminal as claimed in claim 1, when accessing the first code data or the second code data, further comprising carrying out accessing after encrypting/decrypting with an encryption/decryption standard through a random encoding/decoding algorithm and the encryption/decryption standard is selected from a group consisting of symmetric encryption/decryption standard and asymmetric encryption/decryption standard.

18. The authentication-authorization system for a mobile communication terminal as claimed in claim 1, wherein the application service program is a website login application service program connected to a website servo terminal for carrying out website login application service or an identification application service program connected to an access security terminal for carrying out access control application service.

19. The authentication-authorization system for a mobile communication terminal as claimed in claim 1, wherein the application service program is a network upload application service program connected to a network upload terminal for carrying out network upload application service, a network download application service program connected to a network download terminal for carrying out network download application service or a document upload/download application service program connected to a document file transmission terminal for carrying out document receipt/forwarding application service.

20. The authentication-authorization system for a mobile communication terminal as claimed in claim 1, wherein the card is a chip card or a Subscriber Identity Module (SIM).

21. The authentication-authorization system for a mobile communication terminal as claimed in claim 1, wherein the second authentication program further comprises requiring the first authentication program and the third authentication program to execute the time synchronization program, and re-generate a new reference time point in an aperiodic and random manner.

22. The authentication-authorization system for a mobile communication terminal as claimed in claim 1, wherein the second authentication program further comprises regenerating the new reference time point driven by the third authentication program.

23. The authentication-authorization system for a mobile communication terminal as claimed in claim 1, wherein the second authentication program further comprises spot-checking and authenticating the validity of the reference time point of the first authentication program and the third authentication program in an aperiodic and random manner.

24. The authentication-authorization system for a mobile communication terminal as claimed in claim 23, wherein when the result of the second authentication program spot-checking and authenticating the reference time point of the first authentication program and/or the third authentication program is incorrect, the second authentication program sends a signal to a management-and-control terminal located at the sixth end for determining the risk mode through a data comparison.

25. The authentication-authorization system for a mobile communication terminal as claimed in claim 1, wherein the first code data is distributedly stored in a random selection manner through the first authentication program, such that the first code data is stored in the card and a memory of the mobile communication terminal respectively.

26. The authentication-authorization system for a mobile communication terminal as claimed in claim 1, wherein the second code data is distributedly stored in a random selection manner through the second authentication program, such that the second code data is stored in the code database and a storage region of the data management terminal respectively.

27. The authentication-authorization system for a mobile communication terminal as claimed in claim 1, wherein the first buffer code data is randomly selected from the first code data in the card and the first code data in the memory.

28. The authentication-authorization system for a mobile communication terminal as claimed in claim 1, wherein the second buffer code data is randomly selected from the second code data in the code database and the second code data in the storage region.

29. The authentication-authorization system for a mobile communication terminal as claimed in claim 1, wherein the process of carrying out a comparison between the first buffer code data and the second buffer code data further comprises randomly extracting a part of code data of the first buffer code data and the second buffer code data by the second authentication program for comparison, to determine the authentication-authorization result.

30. The authentication-authorization system for a mobile communication terminal as claimed in claim 1, wherein the system further comprises a buffer data storage terminal, located at the seventh end, for backing up the first buffer code data transferred by the first authentication program and the second buffer code data transferred by the second authentication program in sync when comparing.

31. An authentication-authorization system for a mobile communication terminal, applied in a Mobile Internet architecture, the system comprising:
    a mobile communication terminal, located at a first end and having a first authentication program for executing the authentication-authorization, a plurality of application service programs which can provide an application service, and a mobile terminal identification data;
    a card, optionally installed in the mobile communication terminal and having a card identification data and a preset code data;
    a data management terminal, located at a second end, for executing a second authentication program which can provide the authentication-authorization, and a preset code data same as the one in the card; and an encoding terminal, located at a third end, for executing a third authentication program which can provide the authentication-authorization, and being responsible for dynamically generating a code data for the authentication-authorization to the card and the data management terminal continuously and randomly according to a request of the data management terminal;

wherein, after the system activates the mobile communication terminal, and installs the card to make the mobile communication terminal in a first connect state, and completes initialization, when the application service program requests the first authentication program executing authentication-authorization, a data buffer time point is randomly appointed by the first authentication program and the second authentication program, and when reaching the data buffer time point, a first code data of the card and a second code data of the data management terminal are respectively buffered as a first buffer code data and a second buffer code data in sync; after buffering is complete, the first buffer code data together with the card identification data and the mobile terminal identification data is transferred to the second authentication program by the first authentication program for being compared with the second buffer code data to determine the authentication-authorization result; if matching, the first authentication program will be authorized by the second authentication program to allow the requesting application service program to proceed, wherein the process of the system activating the mobile communication terminal and installing the card to make the mobile communication terminal in the first connect state and completing initialization further comprises the mobile communication terminal activating the first authentication program to transfer the mobile terminal identification data to the third authentication program of the encoding terminal, to carry out authentication-authorization of the mobile communication terminal; then the first authentication program reading the card identification data and the preset code data of the card, and transferring them together with the mobile terminal identification data to the second authentication program of the data management terminal to carry out authentication-authorization of the mobile communication terminal; when the mobile communication terminal passes the authentication-authorization of the encoding terminal and the data management terminal respectively, with the mobile communication terminal staying connected, the second authentication program sending a request to the third authentication program for starting continuously generating and transferring the code data to the first authentication program and then storing the code data in the card for being updated to the first code data, and transferring the code data to the second authentication program for being updated to the second code data, such that the first authentication program can accept a call from the application service program to execute authentication-authorization at any time, and wherein the part of the third authentication program continuously generating the code data further comprises allocating the time for transmitting the code data to the first authentication program and the second authentication program according the actual data flow.

32. An authentication-authorization system for a mobile communication terminal, applied in a Mobile Internet architecture, the system comprising:

a mobile communication terminal, located at a first end and having a first authentication program for executing the authentication-authorization, a plurality of application service programs which can provide an application service, and a mobile terminal identification data;

a card, optionally installed in the mobile communication terminal and having a card identification data and a preset code data;

a data management terminal, located at a second end, for executing a second authentication program which can provide the authentication-authorization, and a preset code data same as the one in the card; and an encoding terminal, located at a third end, for executing a third authentication program which can provide the authentication-authorization, and being responsible for dynamically generating a code data for the authentication-authorization to the card and the data management terminal continuously and randomly according to a request of the data management terminal;

wherein, after the system activates the mobile communication terminal, and installs the card to make the mobile communication terminal in a first connect state, and completes initialization, when the application service program requests the first authentication program executing authentication-authorization, a data buffer time point is randomly appointed by the first authentication program and the second authentication program, and when reaching the data buffer time point, a first code data of the card and a second code data of the data management terminal are respectively buffered as a first buffer code data and a second buffer code data in sync; after buffering is complete, the first buffer code data together with the card identification data and the mobile terminal identification data is transferred to the second authentication program by the first authentication program for being compared with the second buffer code data to determine the authentication-authorization result; if matching, the first authentication program will be authorized by the second authentication program to allow the requesting application service program to proceed, wherein the process of the system activating the mobile communication terminal and installing the card to make the mobile communication terminal in the first connect state and completing initialization further comprises the mobile communication terminal activating the first authentication program to transfer the mobile terminal identification data to the third authentication program of the encoding terminal, to carry out authentication-authorization of the mobile communication terminal; then the first authentication program reading the card identification data and the preset code data of the card, and transferring them together with the mobile terminal identification data to the second authentication program of the data management terminal to carry out authentication-authorization of the mobile communication terminal; when the mobile communication terminal passes the authentication-authorization of the encoding terminal and the data management terminal respectively, with the mobile communication terminal staying connected, the second authentication program sending a request to the third authentication program for starting continuously generating and transferring the code data to the first authentication program and then storing the code data in the card for being updated to the first code data, and transferring the code data to the second authentication program for being updated to the second code data, such that the first authentication program can accept a call from the application service program to execute authentication-authorization at any time, and wherein the part of the third authentication program continuously generating the code data randomly determines the time point for generating the code data through the third authentication program.

33. An authentication-authorization method for a mobile communication terminal, applied in an authentication-authorization system for a mobile communication terminal of a Mobile Internet architecture, the authentication-authorization system for a mobile communication terminal including a mobile communication terminal, located at a first end and having a first authentication program for executing the authentication-authorization, a plurality of application service programs for providing application services, and a mobile terminal identification data; a card, optionally installed in the mobile communication terminal and having a card identification data and a preset code data; a data management terminal, located at a second end, executing a second authentication program which can provide authentication-authorization and preset code data the same as the one in the card; and an encoding terminal, located at a third end and executing a third authentication program which can provide authentication-authorization and is responsible for dynamically generating a code data for the authentication-authorization to the card and the data management terminal continuously and randomly according to the request of the data management terminal, the authentication-authorization method for a mobile communication terminal comprises:

activating the mobile communication terminal and installing the card to make the mobile communication terminal in a first connect state and completing initialization;

randomly appointing a data buffer time point by the first authentication program and the second authentication program when the application service program requests executing the authentication-authorization from the first authentication program, and buffering the first code data in the card and a second code data of the data management terminal respectively as a first buffer code data and a second buffer code data in sync when reaching the data buffer time point;

transferring the first buffer code data together with the card identification data and the mobile terminal identification data to the second authentication program by the first authentication program after completing buffering, and carrying out a comparison with the second buffer code data to determine the authentication-authorization result; and authorizing the first authentication program to allow the requesting application service program to proceed by the second authentication program if matching, in the process of activating the mobile communication terminal and installing the card to make the mobile communication terminal in a first connect state and completing initialization, the method further comprising:

activating the first authentication program by the mobile communication terminal to transfer the mobile terminal identification data to the third authentication program of the encoding terminal, to carry out authentication-authorization for the mobile communication terminal;

reading the card identification data and the preset code data of the card by the first authentication program, transferring them together with the mobile terminal identification data to the second authentication program of the data management terminal to carry out authentication-authorization for the mobile communication terminal;

with the mobile communication terminal staying connected, sending a request by the second authentication program to the third authentication program for starting continuously generating and transferring the code data to the first authentication program, after the mobile communication terminal passes the authentication-authorization of the encoding terminal and the data management terminal, and then storing the code data in the card for being updated to the first code data, and transferring the code data to the second authentication program for being updated to the second code data; and allowing the first authentication program to accept a call from the application service program to execute authentication-authorization at any time, wherein the part of the third authentication program continuously generating the code data randomly updates and generates the new first code data and the new second code data in a single data accumulation mode, a multi-data-block update mode, an all-data-block update mode, a random deletion update mode, or a random field update mode.

34. The authentication-authorization method and system for a mobile communication terminal as claimed in claim 33, when the mobile communication terminal is in a disconnect state, the method further comprising:

ceasing generating the code data by the third authentication program, and at the same time the first authentication program buffering the first code data as a buffer code data;

transferring the mobile terminal identification data by the first authentication program to the third authentication program of the encoding terminal again when the mobile communication terminal resumes connection, to carry out authentication-authorization for the mobile communication terminal;

reading the card identification data and the buffer code data of the card by the first authentication program, then transferring the card identification data and the buffer code data of the card together with the mobile terminal identification data to the second authentication program of the data management terminal to carry out authentication-authorization for the mobile communication terminal;

sending a request by the second authentication program to the third authentication program for continuously re-generating the code data to the first authentication program after the mobile communication terminal passes the authentication-authorization of the encoding terminal and the data management terminal, and storing the code data in the card as the first code data and to the second authentication program as the second code data; and resuming accepting a call from the application service program for the first authentication program to execute authentication-authorization at any time.

35. The authentication-authorization method for a mobile communication terminal as claimed in claim 34, wherein when the mobile communication terminal is in a disconnect state, the second authentication program requires a random encoding/decoding algorithm randomly changing the encryption/decryption standard.

36. The authentication-authorization method for a mobile communication terminal as claimed in claim 34, wherein when the mobile communication terminal is in a disconnect state, further comprising the step of requiring a random encoding/decoding algorithm randomly changing the encryption/decryption standard at the same time by the third authentication program.

37. The authentication-authorization method for a mobile communication terminal as claimed in claim 34, wherein the buffer code data is randomly selected from the first code data in the memory joined with the first code data in the card by the first authentication program, and is reverted when resuming connection.

38. The authentication-authorization method for a mobile communication terminal as claimed in claim 34, wherein the buffer code data is randomly selected from the first code data in the memory joined with part of the first code data in the card by the third authentication program, and is reverted when resuming connection.

39. The authentication-authorization method for a mobile communication terminal as claimed in claim 34, wherein the third authentication program further comprises transferring a random selection result to the second authentication program for storage, and transferring the random selection result to the first authentication program by the second authentication program to revert the buffer code data when resuming connection.

40. The authentication-authorization method for a mobile communication terminal as claimed in claim 33, wherein the method further comprises the step of
 connecting to more than one application service terminals located at a fourth end, the terminals providing different application services, having a service terminal identification data respectively, and executing a fourth authentication program which can provide authentication -authorization, further including:
 requiring the mobile communication terminal to request an authentication-authorization when the application service terminal provides an application service, and executing a time verification and randomly appointing a data buffer time point by the first authentication program and the second authentication program, and when reaching the data buffer time point, buffering a first code data in the card and a second code data of the data management terminal respectively as a first buffer code data and a second buffer code data in sync;
 after completing buffering, transferring the first buffer code data together with the card identification data and the mobile terminal identification data by the first authentication program to the second authentication program and the fourth authentication program respectively for carrying out a first comparison with the second buffer code data by the second authentication program, and then the fourth authentication program transferring the first buffer code data together with the card identification data and the mobile terminal identification data together with the service terminal identification data to the second authentication program for carrying out a second comparison with the second buffer code data, to determine the authentication-authorization result; and
 if matching, authorizing the application service terminal making a request to resume providing an application service to the first authentication program.

41. The authentication-authorization method for a mobile communication terminal as claimed in claim 40, wherein the application service terminal is a media download terminal capable of providing a multimedia content to the mobile communication terminal, and the mobile communication terminal further transferring the multimedia content to a multimedia terminal located at a fifth end.

42. The authentication-authorization method for a mobile communication terminal as claimed in claim 40, wherein the application service terminal is a document file download terminal capable of providing a document file content to the mobile communication terminal, and the mobile communication terminal further transferring the document file content to the multimedia terminal located at the fifth end.

43. The authentication-authorization method for a mobile communication terminal as claimed in claim 40, wherein the application service terminal is a software file download terminal for providing a software file content to the mobile communication terminal, and the mobile communication terminal further transferring the software file content to the multimedia terminal located at the fifth end.

44. The authentication-authorization method for a mobile communication terminal as claimed in claim 33, when the application service program requests the first authentication program executing authentication-authorization, further comprising requiring the first authentication program and the third authentication program to execute the time synchronization program by the second authentication program, to generate a reference time point as a time reference of the authentication-authorization.

45. The authentication-authorization method for a mobile communication terminal as claimed in claim 33, wherein the third authentication program further comprises randomly determining a split pattern of the code data for splitting the code data, and transferring the split code data to the first authentication program and the second authentication program through more than one data transmission channel respectively for reverting the split code data as the code data.

46. The authentication-authorization method for a mobile communication terminal as claimed in claim 45, wherein the split pattern is selected from a group consisting of data length, data field, and data bits.

47. The authentication-authorization method for a mobile communication terminal as claimed in claim 45, wherein the data transmission channel is selected from a group consisting of satellite communication, Internet communication, and mobile network communication.

48. The authentication-authorization method for a mobile communication terminal as claimed in claim 33, wherein the first code data is directly received from the second authentication program or from the third authentication program.

49. The authentication-authorization method for a mobile communication terminal as claimed in claim 33, when accessing the first code data or the second code data, further comprising accessing after carrying out the encryption/decryption in an encryption/decryption standard through a random encoding/decoding algorithm and the encryption/decryption standard is selected from the group consisting of a symmetric encryption/decryption standard and an asymmetric encryption/decryption standard.

50. The authentication-authorization method for a mobile communication terminal as claimed in claim 33, wherein the application service program is a website login application service program connected to a website servo terminal for carrying out website login application service or an identification application service program connected to an access security terminal for carrying out access control application service.

51. The authentication-authorization method for a mobile communication terminal as claimed in claim 33, wherein the application service program is a network upload application service program connected to a network upload terminal for carrying out network upload application service, a network download application service program connected to a network download terminal for carrying out network download application service or a document upload/download application service program connected to a document file transmission terminal for carrying out document receipt/forwarding application service.

52. The authentication-authorization method for a mobile communication terminal as claimed in claim 33, wherein the card is a chip card or a SIM.

53. The authentication-authorization method for a mobile communication terminal as claimed in claim 33, wherein the second authentication program further comprises requesting the first authentication program and the third authentication program to execute the time synchronization program and re-generate the new reference time point in an aperiodic and random manner.

54. The authentication-authorization method for a mobile communication terminal as claimed in claim 33, wherein the second authentication program further comprises re-generating the new reference time point driven by the third authentication program.

55. The authentication-authorization method for a mobile communication terminal as claimed in claim 33, wherein the second authentication program further comprises spot-checking and authenticating the validity of the reference time point of the first authentication program and the third authentication program in an aperiodic and random manner.

56. The authentication-authorization method for a mobile communication terminal as claimed in claim 55, wherein when the result of the second authentication program spot-checking and authenticating the reference time point of the first authentication program and/or the third authentication program is incorrect, the second authentication program sends a signal to a management-and-control terminal located at a sixth end for determining the risk mode through a data comparison.

57. The authentication-authorization method for a mobile communication terminal as claimed in claim 33, wherein the first code data is distributedly stored in a random selection manner through the first authentication program, such that the first code data is stored in the card and a memory of the mobile communication terminal respectively.

58. The authentication-authorization method for a mobile communication terminal as claimed in claim 33, wherein the second code data is distributedly stored in a random selection manner through the second authentication program, such that the second code data is stored in the code database and a storage region of the data management terminal respectively.

59. The authentication-authorization method for a mobile communication terminal as claimed in claim 33, wherein the first buffer code data is randomly selected from the first code data in the card and the first code data in the memory.

60. The authentication-authorization method for a mobile communication terminal as claimed in claim 33, wherein the second buffer code data is randomly selected from the second code data in the code database and the second code data in the storage region.

61. The authentication-authorization method for a mobile communication terminal as claimed in claim 33, wherein the process of carrying out the comparison between the first buffer code data and the second buffer code data further comprises randomly extracting a part of code data of the first buffer code data and the second buffer code data for carrying out the comparison by the second authentication program, to determine the authentication-authorization result.

62. The authentication-authorization method first buffer code data and the second buffer code data for carrying out the comparison by for a mobile communication terminal as claimed in claim 33, wherein the method further comprises a buffer data storage terminal, located at the seventh end, for backing up the first buffer code data transferred by the first authentication program and the second buffer code data transferred by the second authentication program in sync at each comparison.

63. The authentication-authorization method for a mobile communication terminal as claimed in claim 33, wherein when the mobile communication terminal is in a disconnect state, the third authentication program requires a random encoding/decoding algorithm randomly changing the encryption/decryption standard.

64. An authentication-authorization method for a mobile communication terminal, applied in an authentication-authorization system for a mobile communication terminal of a Mobile Internet architecture, the authentication-authorization system for a mobile communication terminal including a mobile communication terminal, located at a first end and having a first authentication program for executing the authentication-authorization, a plurality of application service programs for providing application services, and a mobile terminal identification data a card, optionally installed in the mobile communication terminal and having a card identification data and a preset code data a data management terminal, located at a second end, executing a second authentication program which can provide authentication-authorization and preset code data the same as the one in the card; and an encoding terminal, located at a third end and executing a third authentication program which can provide authentication-authorization and is responsible for dynamically generating a code data for the authentication-authorization to the card and the data management terminal continuously and randomly according to the request of the data management terminal, the authentication -authorization method for a mobile communication terminal comprises:

activating the mobile communication terminal and installing the card to make the mobile communication terminal in a first connect state and completing initialization;

randomly appointing a data buffer time point by the first authentication program and the second authentication program when the application service program requests executing the authentication-authorization from the first authentication program, and buffering the first code data in the card and a second code data of the data management terminal respectively as a first buffer code data and a second buffer code data in sync when reaching the data buffer time point;

transferring the first buffer code data together with the card identification data and the mobile terminal identification data to the second authentication program by the first authentication program after completing buffering, and carrying out a comparison with the second buffer code data to determine the authentication-authorization result; and authorizing the first authentication program to allow the requesting application service program to proceed by the second authentication program if matching, in the process of activating the mobile communication terminal and installing the card to make the mobile communication terminal in a first connect state and completing initialization, the method further comprising:

activating the first authentication program by the mobile communication terminal to transfer the mobile terminal identification data to the third authentication program of the encoding terminal, to carry out authentication-authorization for the mobile communication terminal;

reading the card identification data and the preset code data of the card by the first authentication program, transferring them together with the mobile terminal identification data to the second authentication program of the data management terminal to carry out authentication-authorization for the mobile communication terminal;

with the mobile communication terminal staying connected, sending a request by the second authentication program to the third authentication program for starting continuously generating and transferring the code data to the first authentication program, after the mobile communication terminal passes the authentication-authorization of the encoding terminal and the data management terminal, and then storing the code data in the card for being updated to the first code data, and transferring the code data to the second authentication program for being updated to the second code data; and allowing the first authentication program to accept a call from the application service program to execute authentication-authorization at any time, wherein the part of the third authentication program continuously generating the code data further comprises allocating the time for transmitting the code data to the first authentication program and the second authentication program according the actual data flow.

65. An authentication-authorization method for a mobile communication terminal, applied in an authentication-authorization system for a mobile communication terminal of a Mobile Internet architecture, the authentication-authorization system for a mobile communication terminal including a mobile communication terminal, located at a first end and having a first authentication program for executing the authentication-authorization, a plurality of application service programs for providing application services, and a mobile terminal identification data a card, optionally installed in the mobile communication terminal and having a card identification data and a preset code data a data management terminal, located at a second end, executing a second authentication program which can provide authentication-authorization and preset code data the same as the one in the card; and an encoding terminal, located at a third end and executing a third authentication program which can provide authentication-authorization and is responsible for dynamically generating a code data for the authentication-authorization to the card and the data management terminal continuously and randomly according to the request of the data management terminal, the authentication-authorization method for a mobile communication terminal comprises:

activating the mobile communication terminal and installing the card to make the mobile communication terminal in a first connect state and completing initialization;

randomly appointing a data buffer time point by the first authentication program and the second authentication program when the application service program requests executing the authentication-authorization from the first authentication program, and buffering the first code data in the card and a second code data of the data management terminal respectively as a first buffer code data and a second buffer code data in sync when reaching the data buffer time point;

transferring the first buffer code data together with the card identification data and the mobile terminal identification data to the second authentication program by the first authentication program after completing buffering, and carrying out a comparison with the second buffer code data to determine the authentication-authorization result; and authorizing the first authentication program to allow the requesting application service program to proceed by the second authentication program if matching, in the process of activating the mobile communication terminal and installing the card to make the mobile communication terminal in a first connect state and completing initialization, the method further comprising:

activating the first authentication program by the mobile communication terminal to transfer the mobile terminal identification data to the third authentication program of the encoding terminal, to carry out authentication-authorization for the mobile communication terminal;

reading the card identification data and the preset code data of the card by the first authentication program, transferring them together with the mobile terminal identification data to the second authentication program of the data management terminal to carry out authentication -authorization for the mobile communication terminal;

with the mobile communication terminal staying connected, sending a request by the second authentication program to the third authentication program for starting continuously generating and transferring the code data to the first authentication program, after the mobile communication terminal passes the authentication-authorization of the encoding terminal and the data management terminal, and then storing the code data in the card for being updated to the first code data, and transferring the code data to the second authentication program for being updated to the second code data; and allowing the first authentication program to accept a call from the application service program to execute authentication-authorization at any time, wherein the part of the third authentication program continuously generating the code data randomly determines the time point of generating the code data through the third authentication program.

* * * * *